United States Patent
Akimatsu et al.

(10) Patent No.: US 9,819,289 B2
(45) Date of Patent: Nov. 14, 2017

(54) CONTROL APPARATUS FOR ROTATING ELECTRIC MACHINE

(71) Applicants: DENSO CORPORATION, Kariya, Aichi-pref. (JP); ASMO CO., LTD., Kosai, Shizuoka-pref. (JP)

(72) Inventors: Ryunosuke Akimatsu, Kariya (JP); Toshihiro Uchida, Nagoya (JP)

(73) Assignees: DENSO CORPORATION, Kariya (JP); ASMO CO., LTD., Kosai (JP)

( * ) Notice: Subject to any disclaimer, the term of this patent is extended or adjusted under 35 U.S.C. 154(b) by 0 days.

(21) Appl. No.: 15/420,698

(22) Filed: Jan. 31, 2017

(65) Prior Publication Data

US 2017/0222583 A1 Aug. 3, 2017

(30) Foreign Application Priority Data

Feb. 1, 2016 (JP) .................................. 2016-017405
Nov. 25, 2016 (JP) .................................. 2016-229230

(51) Int. Cl.
- *H02P 27/04* (2016.01)
- *H02P 6/16* (2016.01)
- *H02P 27/08* (2006.01)
- *H02K 1/27* (2006.01)

(52) U.S. Cl.
CPC ............. *H02P 6/16* (2013.01); *H02K 1/2786* (2013.01); *H02P 27/08* (2013.01)

(58) Field of Classification Search
CPC .... H02P 21/00; H02P 3/00; H02P 5/00; H02P 7/00; H02P 23/00; H02P 25/00; H02P 27/00; H02P 6/10; H02P 25/06; H02P 25/08; H02P 1/42
USPC ........... 318/400.01, 400.02, 400.14, 400.15, 318/400.12, 700, 701, 721, 779, 799, 800, 318/801, 430, 432, 437; 310/156.01, 310/156.07, 223
See application file for complete search history.

(56) References Cited

U.S. PATENT DOCUMENTS

| | | | |
|---|---|---|---|
| 6,404,152 B1 | 6/2002 | Kobayashi et al. | |
| 9,571,017 B2 * | 2/2017 | Hirotani | H02P 25/22 |
| 2010/0194320 A1 | 8/2010 | Kaneko | |

* cited by examiner

*Primary Examiner* — Antony M Paul
(74) *Attorney, Agent, or Firm* — Oliff PLC

(57) ABSTRACT

In a control apparatus, a magnetic flux information acquiring unit acquires magnetic flux information of magnetic poles of a rotating electric machine. A fundamental setting unit sets a fundamental command value for supplying a fundamental current to a winding of the rotating electric machine. A harmonic setting unit sets, based on the magnetic flux information acquired by the magnetic flux information acquiring unit, a harmonic command value for supplying a reduction current to the winding. The reduction current is a harmonic current for reducing variation in a radial electromagnetic force acting on a rotor of the rotating electric machine. An operating unit operates, based on the fundamental command value set by the fundamental setting unit and the harmonic command value set by the harmonic setting unit, an electric power converter to supply the winding with a drive current that is obtained by superimposing the reduction current on the fundamental current.

11 Claims, 9 Drawing Sheets

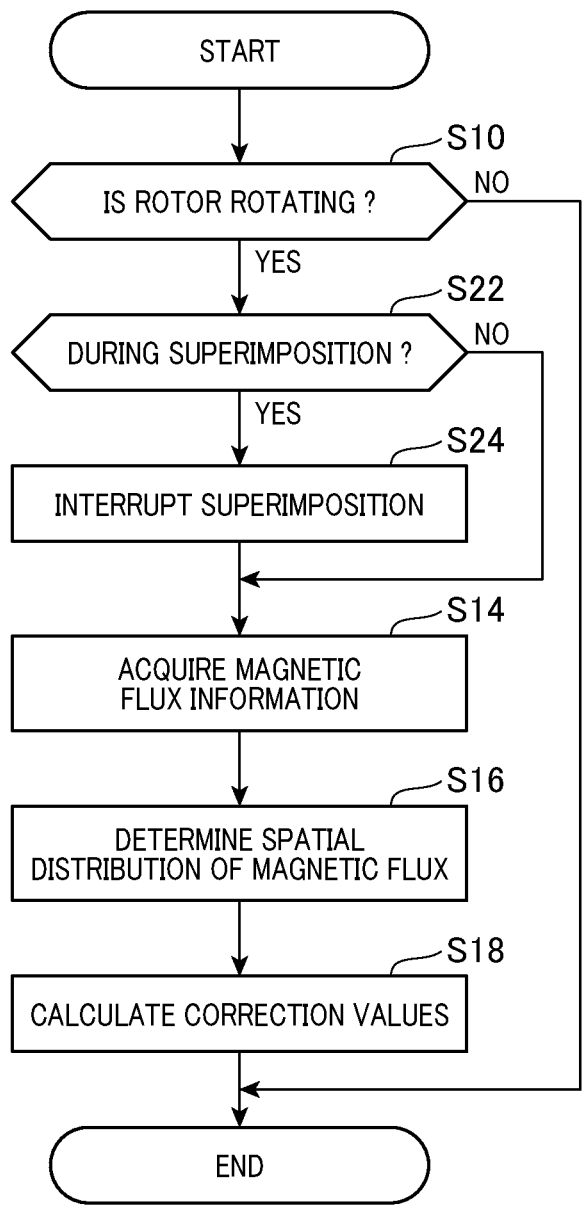

CONTROL APPARATUS FOR ROTATING ELECTRIC MACHINE

CROSS-REFERENCE TO RELATED APPLICATIONS

This application is based on and claims priority from Japanese Patent Applications No. 2016-17405 filed on Feb. 1, 2016 and No. 2016-229230 filed on Nov. 25, 2016, the contents of which are hereby incorporated by reference in their entireties into this application.

BACKGROUND

1 Technical Field

The present invention relates to a control apparatus for a rotating electric machine, the control apparatus being applied to a system which includes the rotating electric machine and an electric power converter, the rotating electric machine including a stator having a winding wound therein and a rotor having magnetic poles formed therein, the electric power converter being electrically connected with the rotating electric machine to supply a drive current to the winding and thereby drive the rotating electric machine.

2 Description of Related Art

Japanese Patent No. JP3366858B2 discloses a control apparatus for a rotating electric machine. The control apparatus includes a memory and a correction information generating circuit. The memory stores therein information on variation in an electromagnetic force acting on a stator core. The correction information generating circuit generates, based on the electromagnetic force variation information read out from the memory according to a magnetic pole position of a rotor, correction information for correcting the electromagnetic force variation. Here, the electromagnetic force variation information denotes information on variation in a radial component of the electromagnetic force acting on the stator core. The control apparatus corrects, based on the correction information, the waveforms of harmonic currents supplied to stator windings, thereby suppressing the variation in the radial electromagnetic force acting on the stator core.

The inventors of the present application have encountered a problem that apart from variation in a radial electromagnetic force acting on a stator, variation in a radial electromagnetic force acting on a rotor may cause vibration and noise of a rotating electric machine to increase. To solve this problem, it may be considered to supply stator windings with harmonic currents, which are set for reducing the variation in the radial electromagnetic force acting on the rotor, and thereby reduce the variation in the radial electromagnetic force. However, due to differences between individual rotating electric machines that are mass-produced, the magnetic flux characteristics of magnetic poles vary between individual rotating electric machines. Moreover, with the variation in the magnetic flux characteristics, the harmonic currents suitable for reducing the variation in the radial electromagnetic force may also vary between individual rotating electric machines. Therefore, to reduce the variation in the radial electromagnetic force, it is required to determine the suitable harmonic currents for each individual rotating electric machine.

SUMMARY

According to exemplary embodiments, there is provided a control apparatus for a rotating electric machine. The control apparatus is applied to a system which includes the rotating electric machine and an electric power converter. The rotating electric machine includes a stator having a winding wound therein and a rotor having a plurality of magnetic poles formed therein. The electric power converter is electrically connected with the rotating electric machine to supply a drive current to the winding and thereby drive the rotating electric machine. The control apparatus includes a magnetic flux information acquiring unit, a fundamental setting unit, a harmonic setting unit and an operating unit. The magnetic flux information acquiring unit acquires magnetic flux information of the magnetic poles. The fundamental setting unit sets a fundamental command value for supplying a fundamental current to the winding. The harmonic setting unit sets, based on the magnetic flux information acquired by the magnetic flux information acquiring unit, a harmonic command value for supplying a reduction current to the winding. The reduction current is a harmonic current for reducing variation in a radial electromagnetic force acting on the rotor. The operating unit operates, based on the fundamental command value set by the fundamental setting unit and the harmonic command value set by the harmonic setting unit, the electric power converter to supply the winding with the drive current that is obtained by superimposing the reduction current on the fundamental current.

In general, due to differences between individual rotating electric machines that are mass-produced, the magnetic flux characteristics of the magnetic poles vary between individual rotating electric machines. Therefore, the electromagnetic force component which varies at the variation angular speed of the magnetic flux of the magnetic poles during rotation of the rotor differs between individual rotating electric machines. Accordingly, to reduce the radial electromagnetic force, it is required to determine, for each individual rotating electric machine, the electromagnetic force component which varies at the variation angular speed of the magnetic flux of the magnetic poles.

Moreover, the electromagnetic force component which varies at the variation angular speed of the magnetic flux of the magnetic poles can be determined based on magnetic flux information of the magnetic poles. Therefore, it is possible to set, for each individual rotating electric machine, a reduction current based on the magnetic flux information of the magnetic poles. Here, the reduction current denotes a harmonic current with which it is possible to reduce variation in the radial electromagnetic force acting on the rotor in the individual rotating electric machine.

In the control apparatus according to the exemplary embodiments, the harmonic setting unit sets, based on the magnetic flux information acquired by the magnetic flux information acquiring unit, the harmonic command value for supplying the reduction current to the winding. The operating unit operates, based on the fundamental command value and the harmonic command value, the electric power converter to supply the winding with the drive current that is obtained by superimposing the reduction current on the fundamental current. Consequently, even when there are differences between individual rotating electric machines, it is still possible to reduce, for each individual rotating electric machine, variation in the radial electromagnetic force acting on the rotor.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 12 is a flow chart illustrating a correction process according to another embodiment.

DESCRIPTION OF EMBODIMENTS

Figure 1:
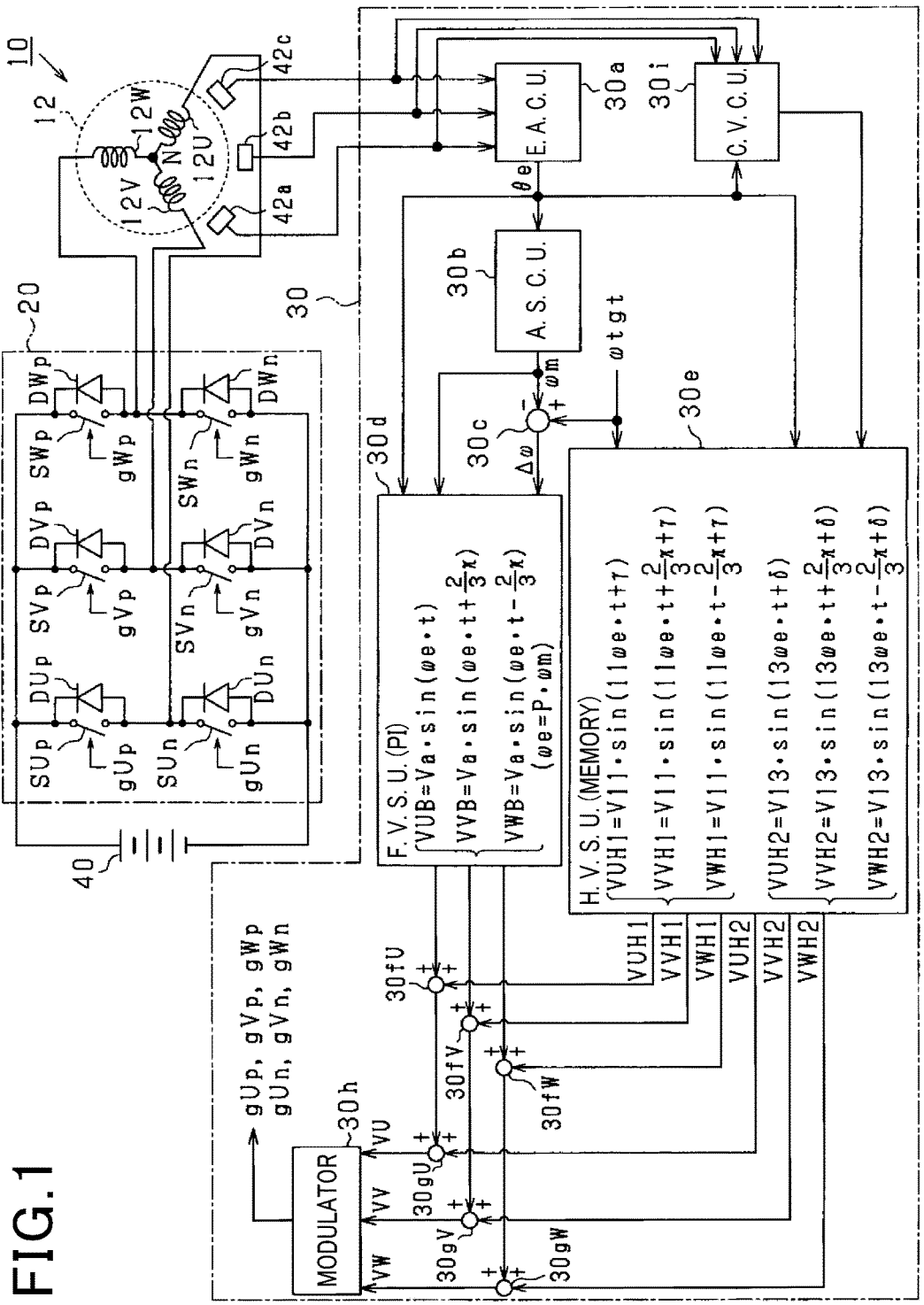
FIG. 1 is an overall configuration diagram of a motor control system according to a first embodiment.

Exemplary embodiments will be described hereinafter with reference to FIGS. 1-12. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of an in-vehicle motor control system to which a control apparatus 30 according to the first embodiment is applied.

As shown in FIG. 1, the motor control system includes a motor 10, a three-phase inverter 20 which is an electric power converter, and the control apparatus 30. The motor 10 is electrically connected, via the inverter 20, to a battery 40 which is a DC power source.

In addition, in the present embodiment, the motor 10 is a blower motor used in an in-vehicle air conditioner.

The inverter 20 includes three pairs of serially-connected upper-arm and lower-arm switches, i.e., a pair of U-phase upper-arm and lower-arm switches SUp and SUn that are electrically connected in series with each other, a pair of V-phase upper-arm and lower-arm switches SVp and SVn that are electrically connected in series with each other, and a pair of W-phase upper-arm and lower-arm switches SWp and SWn that are electrically connected in series with each other.

A junction point between the U-phase upper-arm and lower-arm switches SUp and SUn is electrically connected with a first end of a U-phase stator winding 12U of a stator 12 of the motor 10. A junction point between the V-phase upper-arm and lower-arm switches SVp and SVn is electrically connected with a first end of a V-phase stator winding 12V of the stator 12. A junction point between the W-phase upper-arm and lower-arm switches SWp and SWn is electrically connected with a first end of a W-phase stator winding 12W of the stator 12. Second ends of the U-phase, V-phase and W-phase stator windings 12U, 12V and 12W are electrically connected at a neutral point N. In other words, the U-phase, V-phase and W-phase stator windings 12U, 12V and 12W are star-connected to define the neutral point N therebetween.

To the switches SUp, SVp, SWp, SUn, SVn and SWn, there are respectively connected freewheeling diodes DUp, DVp, DWp, DUn, DVn and DWn in a reverse and parallel manner. In addition, each of the switches SUp, SVp, SWp, SUn, SVn and SWn may be implemented by a voltage-control semiconductor switching element, such as an IGBT (Insulated Gate Bipolar Transistor) or a MOSFET (Metal Oxide Semiconductor Field Effect Transistor).

In the present embodiment, the motor 10 is implemented by a concentrated-winding permanent-magnet synchronous motor. Moreover, as shown in FIG. 2, the motor 10 is configured as an outer rotor motor.

Figure 2:
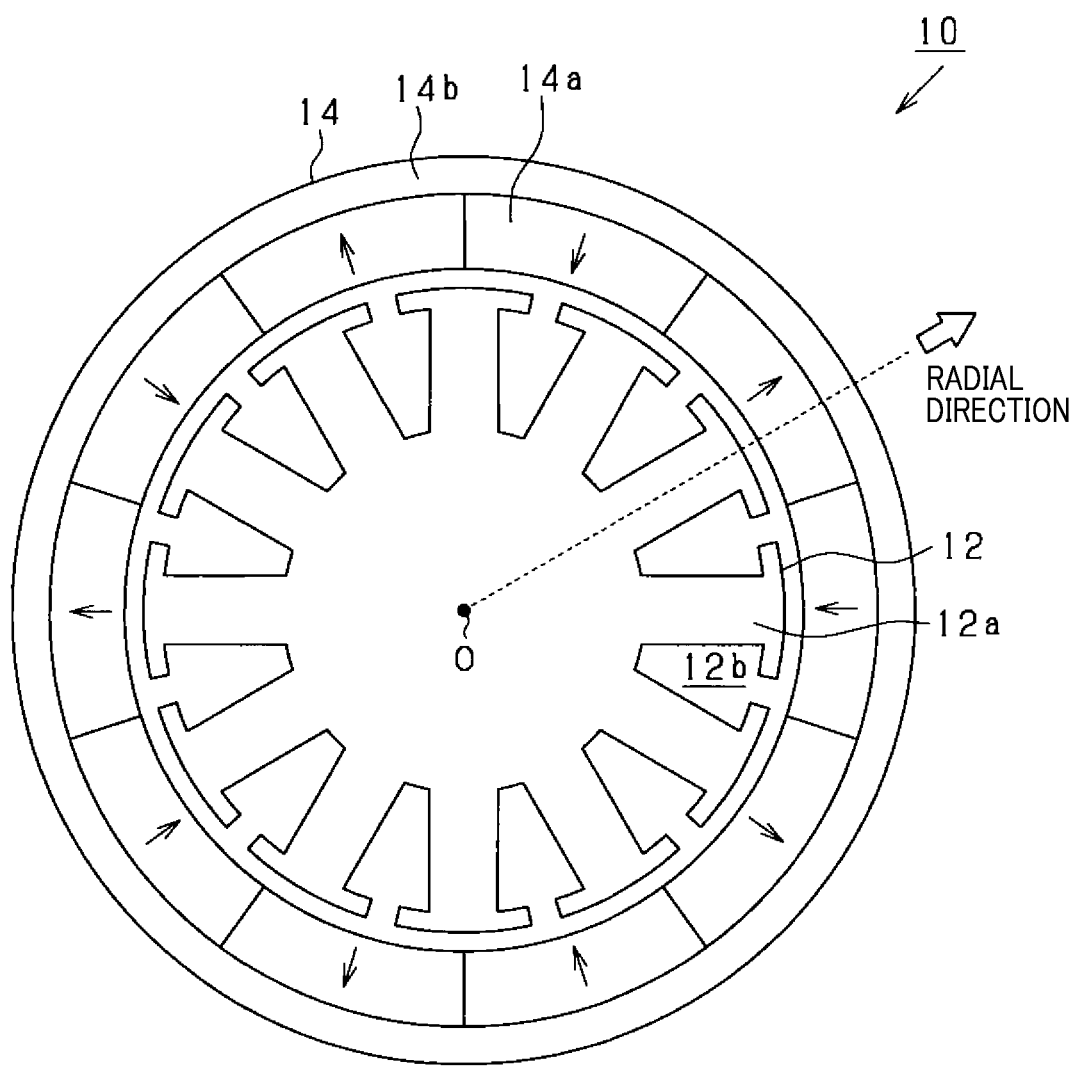
FIG. 2 is a cross-sectional view of a motor included in the motor control system.

In addition, FIG. 2 shows a cross-section of the motor 10 perpendicular to the axial direction of the motor 10 (i.e., the direction of the rotation axis of a rotor 14 of the motor 10). In FIG. 2, a center point O is a point through which the rotation axis of the rotor 14 extends. It should be noted that for the sake of simplicity, hatching lines are omitted from FIG. 2.

In the present embodiment, as shown in FIG. 2, the rotor 10 includes the stator 12 and the rotor 14 that is annular in shape. The rotor 14 is rotatably disposed radially outside the stator 12 with a radial gap formed therebetween.

The rotor 14 includes a plurality of permanent magnets 14a and a back yoke 14b that is made of a soft-magnetic material and connects the permanent magnets 14a. Specifically, in the present embodiment, the rotor 14 includes ten permanent magnets 14a, all of which have the same shape. Each of the permanent magnets 14a is radially magnetized to form one magnetic pole. For each circumferentially-adjacent pair of the permanent magnets 14a, the polarities of the permanent magnets 14a of the pair are different from each other. That is, the permanent magnets 14a are arranged so that the polarities of the permanent magnets 14a alternate between N (North) and S (South) in the circumferential direction of the rotor 14. In addition, in FIG. 2, the heads of arrows indicate the N poles of the permanent magnets 14a.

The stator 12 includes a plurality of teeth 12a, more particularly twelve teeth 12a in the present embodiment. The twelve teeth 12a are arranged at a constant pitch in the circumferential direction of the stator 12 so that twelve slots 12b are formed between circumferentially adjacent teeth 12a in the stator 12.

That is, in the present embodiment, the number P of magnetic pole pairs of the rotor 14 is set to 5, and the number S of the slots 12b of the stator 12 is set to 12.

Referring back to FIG. 1, the control apparatus 30 is constituted mainly of a microcomputer. The control apparatus 30 operates the inverter 20 so as to control a controlled variable of the motor 10 to a command value thereof. In the present embodiment, the controlled variable is the angular speed ωm of rotation of the motor 10 and the command value is a command angular speed ωtgt.

To operate the upper-arm and lower-arm switches SUp, SUn, SVp, SVn, SWp and SWn of the inverter 20, the controller 30 generates upper-arm and lower-arm operation signals gUp, gUn, gVp, gVn, gWp and gWn and outputs them respectively to the upper-arm and lower-arm switches SUp, SUn, SVp, SVn, SWp and SWn. The upper-arm and lower-arm operation signals of the same phase are complementary to each other so that the upper-arm and lower-arm switches of the same phase are alternately turned on. For example, the U-phase upper-arm and lower-arm operation signals gUp and gUn are complementary to each other so that the U-phase upper-arm and lower-arm switches SUp and SUn are alternately turned on. In addition, the command angular speed ωtgt is outputted from an external control apparatus which is provided outside the control apparatus 30 in the vehicle and higher in level than the control apparatus 30.

To the control apparatus 30, there is inputted a detection signal of a magnetic flux detecting unit for detecting a magnetic pole position of the rotor 14. In the present embodiment, the magnetic flux detecting unit is constituted of first, second and third Hall sensors 42a, 42b and 42c which are magnetic sensors. The first, second and third Hall sensors 42a, 42b and 42c are arranged so as to be offset from one another by 60° in mechanical angle of the motor 10. Moreover, the first, second and third Hall sensors 42a, 42b and 42c are arranged at positions where it is possible to detect, of main magnetic flux from the permanent magnets 14a and leakage magnetic flux, the leakage magnetic flux.

In addition, in the present embodiment, the motor 10 is received in a case (not shown); the first, second and third Hall sensors 42a, 42b and 42c are mounted to a substrate (not shown) that is arranged in the case with a substrate surface facing each of the stator 12 and the rotor 14. Consequently, it is possible for the first, second and third Hall sensors 42a, 42b and 42c to detect the leakage magnetic flux.

Next, a drive control of the motor 10 by the control apparatus 30 will be described.

In the present embodiment, the control apparatus 30 includes an electrical angle calculating unit (abbreviated to E. A. C. U. in FIG. 1) 30a, an angular speed calculating unit (abbreviated to A. S. C. U. in FIG. 1) 30b, a deviation calculating unit 30c, a fundamental voltage setting unit (abbreviated to F. V. S. U. in FIG. 1) 30d, a harmonic voltage setting unit (abbreviated to H. V. S. U. in FIG. 1) 30e, U-phase, V-phase and W-phase first superimposing units 30fU, 30fV and 30fW, U-phase, V-phase and W-phase second superimposing units 30gU, 30gV and 30gW, a modulator 30h, and a correction value calculating unit (abbreviated to C. V. C. U. in FIG. 1) 30i.

The electrical angle calculating unit 30a calculates, based on the detection signals of the Hall sensors 42a-42c, the rotation angle of the motor 10, more specifically an electrical angle θe that represents the rotation angle. In addition, in the present embodiment, the electrical angle calculating unit 30a corresponds to a rotation angle calculating unit.

The angular speed calculating unit 30b calculates, based on the electrical angle θe calculated by the electrical angle calculating unit 30a, the angular speed ωm of rotation of the motor 10. In the present embodiment, the angular speed ωm is a mechanical angular speed.

The deviation calculating unit 30c calculates an angular speed deviation Δω by subtracting the angular speed ωm of rotation of the motor 10 calculated by the angular speed calculating unit 30b from the command angular speed ωtgt.

The fundamental voltage setting unit 30d sets, based on the angular speed deviation Δω, the electrical angle θe and the angular speed ωm, U-phase, V-phase and W-phase fundamental voltages VUB, VVB and VWB in a three-phase fixed coordinate system. The U-phase, V-phase and W-phase fundamental voltages VUB, VVB and VWB are the manipulated variables for feedback-controlling the angular speed ωm to the command angular speed ωtgt and can be expressed by the following equations (1):

$$\left.\begin{array}{l}VUB = Va \cdot \sin(\omega_e \cdot t) \\ VVB = Va \cdot \sin\left(\omega_e \cdot t + \frac{2}{3}\pi\right) \\ VWB = Va \cdot \sin\left(\omega_e \cdot t - \frac{2}{3}\pi\right)\end{array}\right\} \quad (1)$$

In the present embodiment, the fundamental voltage setting unit 30d sets the U-phase, V-phase and W-phase fundamental voltages VUB, VVB and VWB by a proportional-integral (abbreviated to PI in FIG. 1) control based on the angular speed deviation Δω. More specifically, by the proportional-integral control, each of the U-phase, V-phase and W-phase fundamental voltages VUB, VVB and VWB is set over one period of the electrical angle θe. As can be seen from the above equations (1), an electrical angular speed ωe is used in the setting of the U-phase, V-phase and W-phase fundamental voltages VUB, VVB and VWB. The electrical angular speed ωe can be determined as the product of the angular speed ωm, which is a mechanical angular speed, and the number P of magnetic pole pairs (i.e., ωe=ωm×P). Moreover, the fundamental voltage setting unit 30d outputs the set U-phase, V-phase and W-phase fundamental voltages VUB, VVB and VWB in association with the electrical angle θe. The waveforms of the U-phase, V-phase and W-phase fundamental voltages VUB, VVB and VWB have the same shape and are offset in phase from each other by (2π/3) in electrical angle θe. In addition, in the above equations (1), Va is the amplitude of each of the U-phase, V-phase and W-phase fundamental voltages VUB, VVB and VWB.

The harmonic voltage setting unit 30e sets, based on the electrical angle θe and the command angular speed ωtgt, U-phase, V-phase and W-phase first harmonic voltages VUH1, VVH1 and VWH1 and U-phase, V-phase and W-phase second harmonic voltages VUH2, VVH2 and VWH2 in the three-phase fixed coordinate system. In the present embodiment, the harmonic voltage setting unit 30e includes a memory which is a data storage unit. The memory may be, for example, a nonvolatile memory. The first harmonic voltages VUH1-VWH1 and second harmonic voltages VUH2-VWH2 are stored in the memory in association with the command angular speed ωtgt and the electrical angle θe. The harmonic voltage setting unit 30e will be described in detail later.

In addition, in the present embodiment, the fundamental voltage setting unit 30d corresponds to a fundamental setting unit and the harmonic voltage setting unit 30e corresponds to a harmonic setting unit.

The U-phase, V-phase and W-phase first superimposing units 30fU, 30fV and 30fW respectively superimpose (or add) the U-phase, V-phase and W-phase first harmonic voltages VUH1, VVH1 and VWH1 on (or to) the U-phase, V-phase and W-phase fundamental voltages VUB, VVB and VWB. The U-phase, V-phase and W-phase second superimposing units 30gU, 30gV and 30gW respectively superimpose (or add) the U-phase, V-phase and W-phase second harmonic voltages VUH2, VVH2 and VWH2 on (or to) the voltages (VUB+VUH1), (VVB+VVH1) and (VWB+VWH1) outputted respectively from the U-phase, V-phase and W-phase first superimposing units 30*f*U, 30N and 30*f*W. The output voltages of the U-phase, V-phase and W-phase second superimposing units 30gU, 30gV and 30gW respectively make up U-phase, V-phase and W-phase command voltages VU, VV and VW. In other words, the U-phase, V-phase and W-phase command voltages VU, VV and VW are respectively set to the output voltages of the U-phase, V-phase and W-phase second superimposing units 30gU, 30gV and 30gW.

The modulator 30*h*, which is an operating unit, generates the upper-arm and lower-arm operation signals gUp, gUn, gVp, gVn, gWp and gWn for bringing the U-phase, V-phase and W-phase output voltages of the inverter 20 respectively into agreement with the U-phase, V-phase and W-phase command voltages VU, VV and VW. Specifically, in the present embodiment, the modulator 30 generates the upper-arm and lower-arm operation signals gUp, gUn, gVp, gVn, gWp and gWn by a PWM process based on comparison of magnitude between each of the U-phase, V-phase and W-phase command voltages VU, VV and VW and a carrier signal. In addition, as the carrier signal, a triangular-wave signal may be used.

When electric current flows in the windings 12U, 12V and 12W of the motor 10 and thus a rotating magnetic field is created in the motor 10, there occurs variation in a radial electromagnetic force acting on the rotor 14. The electromagnetic force varies at each circumferential position of the rotor 14 and acts alternately as an attractive force attracting the rotor 14 to the stator 12 side (i.e., radially inward) and a repulsive force causing the rotor 14 to move away from the stator 12 (i.e., radially outward). The electromagnetic force is an excitation force that causes the rotor 14, which is an elastic body, to vibrate. When the frequency of the electromagnetic force coincides with the resonance frequency of an annular mode (or circular-ring mode) of the rotor 14, noise (or magnetic noise) of the motor 10 may be increased. Moreover, when the frequency of the electromagnetic force coincides with the resonance frequency, vibration of the motor 10 may be increased, thereby increasing vibration of other in-vehicle machines or devices that are mechanically connected with the motor 10; consequently, noise of these in-vehicle machines or devices may also be increased.

Figure 3:
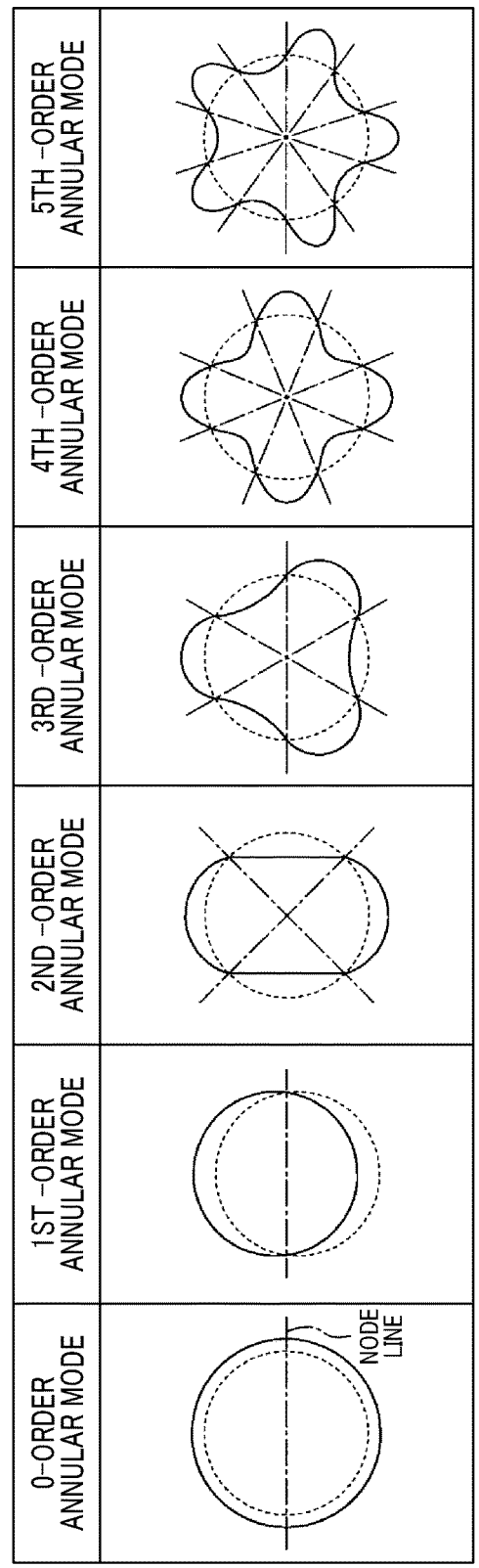
FIG. 3 is a schematic view illustrating resonance modes of a rotor of the motor.

An annular mode is a mode of periodic variation caused in the rotor 14 by the excitation force radially applied to the rotor 14. FIG. 3 illustrates zero-order, first-order, second-order, third-order, fourth-order and fifth-order annular modes as examples.

In FIG. 3, the original shape of the rotor 14 (i.e., the shape of the rotor 14 with no excitation force acting on the rotor 14) is schematically shown with dashed lines; the shape of the rotor 14 with the excitation force acting on the rotor 14 is schematically shown with continuous lines. Moreover, node lines are shown with one-dot chain lines; each of the node lines connects one pair of nodes circumferentially apart from each other by $\pi$ when the rotor 14 is displaced by the excitation force acting thereon. At a midpoint between each adjacent pair of the nodes, there is formed an antinode. At each of the nodes, the rotor 14 is hardly displaced from the original shape when the excitation force acts on the rotor 14.

As shown in FIG. 3, in the zero-order annular mode, the rotor 14 repeats radial expansion and contraction, keeping a similar shape to the original shape.

In the first-order annular mode, the rotor 14 is displaced with a single node line being a reference, while rotating. More specifically, in this mode, one of a pair of antinodes radially expands with respect to the original shape of the rotor 14, while the other one of the pair of antinodes radially contracts. In addition, the pair of antinodes are circumferentially apart from each other by $\pi$.

In the second-order annular mode, the rotor 14 is displaced with two node lines being a reference, while rotating. More specifically, in this mode, a first pair of antinodes radially expand with respect to the original shape of the rotor 14, while a second pair of antinodes radially contract. In addition, the first pair of antinodes are circumferentially apart from each other by $\pi$; the second pair of antinodes are circumferentially apart from each other by $\pi$; the first pair of antinodes are circumferentially offset from the second pair of antinodes by $(\pi/2)$.

In the third-order annular mode, the rotor 14 is displaced with three node lines being a reference, while rotating. More specifically, in this mode, three antinodes radially expand with respect to the original shape of the rotor 14, while another three antinodes radially contract. In addition, the three radially expanding antinodes are circumferentially apart from each other by $(2\pi/3)$; the three radially contracting antinodes are circumferentially apart from each other by $(2\pi/3)$; and the three radially expanding antinodes are circumferentially offset from the three radially contracting antinodes by $(\pi/3)$.

In the fourth-order annular mode, the rotor 14 is displaced with four node lines being a reference, while rotating. More specifically, in this mode, four antinodes radially expand with respect to the original shape of the rotor 14, while another four antinodes radially contract. In addition, the four radially expanding antinodes are circumferentially apart from each other by $(\pi/2)$; the four radially contracting antinodes are circumferentially apart from each other by $(\pi/2)$; and the four radially expanding antinodes are circumferentially offset from the four radially contracting antinodes by $(\pi/4)$.

In the fifth-order annular mode, the rotor 14 is displaced with five node lines being a reference, while rotating. More specifically, in this mode, five antinodes radially expand with respect to the original shape of the rotor 14, while another five antinodes radially contract. In addition, the five radially expanding antinodes are circumferentially apart from each other by $(2\pi/5)$; the five radially contracting antinodes are circumferentially apart from each other by $(2\pi/5)$; and the five radially expanding antinodes are circumferentially offset from the five radially contracting antinodes by $(\pi/5)$.

As above, under the excitation force that causes the Xth-order annular mode to occur, the offset angle between those places where the attractive force increases and those places where the attractive force decreases (or the repulsive force increases) is equal to $(\pi/X)$, where X is a natural number.

Each of the above-described annular modes has its natural resonance frequency (or resonance angular speed). Moreover, for each of the annular modes, when the frequency of the excitation force causing the annular mode to occur is in the vicinity of the resonance frequency of the annular mode, a resonance phenomenon of the rotor 14 occurs. The occurrence of the resonance phenomenon causes problems, such as increase in magnetic noise of the motor 10, more particularly increase in the noise level in the audio-frequency range.

To solve the above problems, in the present embodiment, there is provided the harmonic voltage setting unit 30*e* in the control apparatus 30. The harmonic voltage setting unit 30*e* stores, in the memory, the U-phase, V-phase and W-phase first harmonic voltages VUH1, VVH1 and VWH1 and the U-phase, V-phase and W-phase second harmonic voltages VUH2, VVH2 and VWH2 for suppressing variation in the radial electromagnetic force that causes magnetic noise to occur.

U-phase, V-phase and W-phase fundamental currents IUB, IVB and IWB can be expressed by the following equations (2):

$$IUB = B \cdot \cos(\omega_e \cdot t) + C \cdot \sin(\omega_e \cdot t) \\ IVB = B \cdot \cos\left(\omega_e \cdot t + \frac{2}{3}\pi\right) + C \cdot \sin\left(\omega_e \cdot t + \frac{2}{3}\pi\right) \\ IWB = B \cdot \cos\left(\omega_e \cdot t - \frac{2}{3}\pi\right) + C \cdot \sin\left(\omega_e \cdot t - \frac{2}{3}\pi\right)$$ (2)

The waveforms of the U-phase, V-phase and W-phase fundamental currents IUB, IVB and IWB have the same shape and are offset in phase from each other by ($2\pi/3$) in electrical angle $\theta e$.

Hereinafter, explanation will be made by taking the U phase as an example. The radial electromagnetic force (or node force) of the motor 10 will be designated by F hereinafter. The electromagnetic force F, which is generated by supply of the fundamental currents IUB, IVB and IWB to the U-phase, V-phase and W-phase windings 12U, 12V and 12W, can be expressed by the following equation (3):

$$F(\omega e \cdot t) = G(\omega e \cdot t) \times \{B \cdot \cos(\omega_e \cdot t) + C \cdot \sin(\omega_e \cdot t)\}$$ (3)

It is known that the main components of the electromagnetic force F are the even-number-order components, such as the second-order component, the fourth-order component and the sixth-order component. Therefore, G in the above equation (3) can be expressed as an odd-number-order periodic function by the following equation (4):

$$G(\omega e \cdot t) = \sum_{n=1}^{\infty} [a_{2n-1} \cdot \cos((2n-1)\omega e \cdot t) + b_{2n-1} \cdot \sin((2n-1)\omega e \cdot t)]$$ (4)

In general, a motor is designed to obtain a high average torque by supply of the fundamental currents. Hence, in the lower the order, the larger value the coefficient is set to. Therefore, in the present embodiment, n is set to 1 in the above equation (4). The harmonic currents IH can be expressed by the following equation (5):

$$IH = e \cdot \cos(\beta \cdot \omega_e \cdot t) + f \cdot \sin(\beta \cdot \omega_e \cdot t)$$ (5)

In the above equation (5), $\beta$ is an integer greater than or equal to 2.

By substituting the above equations (4) and (5) into the above equation (3), the harmonic electromagnetic force FH can be expressed by the following equation (6):

$$FH = \\ \left(\frac{a_1 \cdot e - b_1 \cdot f}{2}\right)\cos((1+\beta)\omega e \cdot t) + \left(\frac{a_1 \cdot e + b_1 \cdot f}{2}\right)\cos((1-\beta)\omega e \cdot t) + \\ \left(\frac{a_1 \cdot f + b_1 \cdot e}{2}\right)\sin((1+\beta)\omega e \cdot t) + \left(\frac{b_1 \cdot e - a_1 \cdot f}{2}\right)\sin((1-\beta)\omega e \cdot t)$$ (6)

In the case of ($\beta=6M-1$), where M is an integer greater than or equal to 0, the above equation (6) can be transformed into the following equation (7):

$$FH = \\ \left(\frac{a_1 \cdot e - b_1 \cdot f}{2}\right)\cos(6M \cdot \omega e \cdot t) + \left(\frac{a_1 \cdot e + b_1 \cdot f}{2}\right)\cos((6M-2)\omega e \cdot t) + \\ \left(\frac{a_1 \cdot f + b_1 \cdot e}{2}\right)\sin(6M \cdot \omega e \cdot t) + \left(\frac{a_1 \cdot f + b_1 \cdot e}{2}\right)\sin((6M-2)\omega e \cdot t)$$ (7)

The above equations (5) and (7) indicate that supplying the (6M−1)th-order harmonic currents to the stator windings 12U-12W, the 6Mth-order electromagnetic force and the (6M−2)th-order electromagnetic force will act on the rotor 14. Here, the variation angular speed of the 6Mth-order electromagnetic force and harmonic currents is equal to the product of 6M and the fundamental angular speed (i.e., the variation angular speed $\omega e$ of the fundamental currents IUB-IWB supplied to the stator windings 12U-12W).

Moreover, the above equations (5) and (7) also indicate that it is possible to control the 6Mth-order and (6M−2)th-order electromagnetic forces by supplying the (6M−1)th-order harmonic currents to the stator windings 12U-12W. In the present embodiment, the coefficients e and f in the above equation (7) are adjusted so as to reduce the (6M−2)th-order electromagnetic force. At the same time, with this adjustment, the 6Mth-order electromagnetic force is increased.

On the other hand, in the case of ($\beta=6M+1$), the above equation (6) can be transformed into the following equation (8):

$$FH = \\ \left(\frac{a_1 \cdot e - b_1 \cdot f}{2}\right)\cos((6M+2)\omega e \cdot t) + \left(\frac{a_1 \cdot e + b_1 \cdot f}{2}\right)\cos(6M \cdot \omega e \cdot t) + \\ \left(\frac{a_1 \cdot f + b_1 \cdot e}{2}\right)\sin((6M+2)\omega e \cdot t) + \left(\frac{a_1 \cdot f - b_1 \cdot e}{2}\right)\sin(6M \cdot \omega e \cdot t)$$ (8)

The above equations (5) and (8) indicate that supplying the (6M+1)th-order harmonic currents to the stator windings 12U-12W, the 6Mth-order electromagnetic force and the (6M+2)th-order electromagnetic force will act on the rotor 14. That is, the above equations (5) and (8) indicate that it is possible to control the 6Mth-order and (6M+2)th-order electromagnetic forces by supplying the (6M+1)th-order harmonic currents to the stator windings 12U-12W. In the present embodiment, the coefficients e and f in the above equation (8) are adjusted so as to reduce the 6Mth-order electromagnetic force. At the same time, with this adjustment, the (6M+2)th-order electromagnetic force is increased.

In the present embodiment, the variation angular speed of the tenth-order electromagnetic force is in the vicinity of the resonance angular speed of the second-order annular mode of the rotor 14, causing magnetic noise of the motor 10 to increase. Therefore, based on the facts described above, M is set to 2. Then, by supplying the eleventh-order (i.e., the (6M−1)th-order with M being equal to 2) harmonic currents to the stator windings 12U-12W, the tenth-order (i.e., the (6M−2)th-order with M being equal to 2) electromagnetic force is reduced while the twelfth-order (i.e., the 6Mth-order with M being equal to 2) electromagnetic force is increased. In other words, by superimposing the eleventh-order harmonic currents on the fundamental currents IUB, IVB and IWB, the tenth-order electromagnetic force is converted into the twelfth-order electromagnetic force. However, the variation angular speed of the twelfth-order electromagnetic force is not sufficiently different from the resonance angular speed of the second-order annular mode. Therefore, to the stator windings 12U-12W, there are further supplied the thirteenth-order (i.e., the (6M+1)th-order with M being equal to 2) harmonic currents, thereby reducing the twelfth-order electromagnetic force while increasing the fourteenth-order (i.e., the (6M+2)th-order with M being equal to 2) electromagnetic force. In other words, by further superimposing the thirteenth-order harmonic currents on the fundamental currents IUB, IVB and IWB, the twelfth-order electromagnetic force is converted into the fourteenth-order electromagnetic force. The variation angular speed of the fourteenth-order electromagnetic force is sufficiently different from the resonance angular speed of the second-order annular mode. Consequently, it becomes possible to considerably reduce the magnetic noise of the motor 10.

Specifically, in the present embodiment, on the fundamental currents IUB, IVB and IWB, there are sequentially superimposed the eleventh-order harmonic currents (to be referred to as first harmonic currents IUH1, IVH1 and IWH1 hereinafter) with which it is possible to reduce the tenth-order electromagnetic force and the thirteenth-order harmonic currents (to be referred to as second harmonic currents IUH2, IVH2 and IWH2 hereinafter) with which it is possible to reduce the twelfth-order electromagnetic force increased by the superimposition of the eleventh-order harmonic currents.

Figure 4:
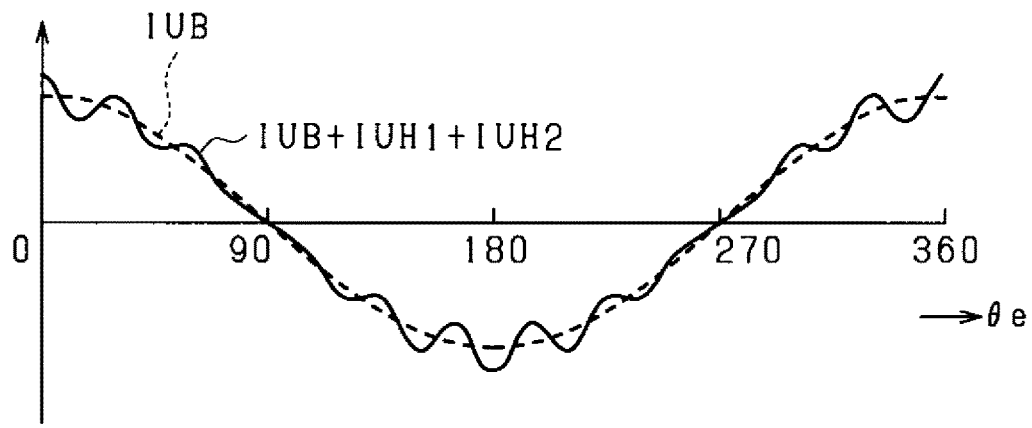
FIG. 4 is a schematic view illustrating a U-phase current which is obtained by superimposing U-phase harmonic currents on a U-phase fundamental current.

FIG. 4 shows the waveform of the U-phase current IU which is obtained by superimposing the U-phase first and second harmonic currents IUH1 and IUH2 on the U-phase fundamental current IUB.

The U-phase first harmonic current IUH1 can be expressed by the following equation (9):

$$IUH1 = e1 \cdot \cos((6M-1)\omega_e \cdot t) + f1 \cdot \sin((6M-1)\omega_e \cdot t) = e1 \cdot \cos(11\omega_e \cdot t) + f1 \cdot \sin(11\omega_e \cdot t) \quad (9)$$

The U-phase second harmonic current IUH2 can be expressed by the following equation (10):

$$IUH2 = e2 \cdot \cos((6M+1)\omega_e \cdot t) + f2 \cdot \sin((6M+1)\omega_e \cdot t) = e2 \cdot \cos(13\omega_e \cdot t) + f2 \cdot \sin(13\omega_e \cdot t) \quad (10)$$

The U-phase, V-phase and W-phase first harmonic currents IUH1, IVH1 and IWH1 are adjusted in phase and amplitude (e.g., the coefficients e1 and f1 in the above equation (9)) so as to reduce the tenth-order electromagnetic force. Moreover, the waveforms of the U-phase, V-phase and W-phase first harmonic currents IUH1, IVH1 and IWH1 have the same shape and are offset in phase from each other by ($2\pi/3$) in electrical angle $\theta e$.

The U-phase, V-phase and W-phase second harmonic currents IUH2, IVH2 and IWH2 are adjusted in phase and amplitude (e.g., the coefficients e2 and f2 in the above equation (10)) so as to reduce the twelfth-order electromagnetic force. Moreover, the waveforms of the U-phase, V-phase and W-phase second harmonic currents IUH2, IVH2 and IWH2 have the same shape and are offset in phase from each other by ($2\pi/3$) in electrical angle $\theta e$.

In the memory of the harmonic voltage setting unit 30e, there are stored in advance the first harmonic voltages VUH1, VVH1 and VWH1 for supplying the first harmonic currents IUH1, IVH1 and IWH1 to the stator windings 12U, 12V and 12W and the second harmonic voltages VUH2, VVH2 and VWH2 for supplying the second harmonic currents IUH2, IVH2 and IWH2 to the stator windings 12U, 12V and 12W.

The first harmonic voltages VUH1, VVH1 and VWH1 (i.e., the eleventh-order harmonic voltages) can be expressed by the following equations $$VUH1 = V11 \cdot \sin(11\omega_e \cdot t + \gamma)$$
$$VVH1 = V11 \cdot \sin\left(11\omega_e \cdot t + \frac{2}{3}\pi + \gamma\right) \quad (11)$$
$$VWH1 = V11 \cdot \sin\left(11\omega_e \cdot t - \frac{2}{3}\pi + \gamma\right)$$

The second harmonic voltages VUH2, VVH2 and VWH2 (i.e., the thirteenth-order harmonic voltages) can be expressed by the following equations (12):

$$VUH2 = V13 \cdot \sin(13\omega_e \cdot t + \delta)$$
$$VVH2 = V13 \cdot \sin\left(13\omega_e \cdot t + \frac{2}{3}\pi + \delta\right) \quad (12)$$
$$VWH2 = V13 \cdot \sin\left(13\omega_e \cdot t - \frac{2}{3}\pi + \delta\right)$$

It should be noted that the transformation from the harmonic currents to the harmonic voltages can be made based on well-known voltage equations that associate the phase voltages applied to the motor 10 with the phase currents.

In the above equations (11), V11 is the amplitude of the first harmonic voltages VUH1, VVH1 and VWH1 (to be simply referred to as first amplitude hereinafter) and $\gamma$ is the phase difference of the first harmonic voltages VUH1, VVH1 and VWH1 from the respective fundamental voltages VUB, VVB and VWB (to be simply referred to as first phase difference hereinafter). In the above equations (12), V13 is the amplitude of the second harmonic voltages VUH2, VVH2 and VWH2 (to be simply referred to as second amplitude hereinafter) and $\delta$ is the phase difference of the second harmonic voltages VUH2, VVH2 and VWH2 from the respective fundamental voltages VUB, VVB and VWB (to be simply referred to as second phase difference hereinafter).

The U-phase, V-phase and W-phase first harmonic voltages VUH1, VVH1 and VWH1 are set so as to reduce the tenth-order electromagnetic force. More specifically, the first phase difference $\gamma$ and the first amplitude V11 in the above equations (11) are adjusted so as to reduce the tenth-order electromagnetic force. In addition, the waveforms of the U-phase, V-phase and W-phase first harmonic voltages VUH1, VVH1 and VWH1 have the same shape and are offset in phase from each other by ($2\pi/3$) in electrical angle $\theta e$.

The U-phase, V-phase and W-phase second harmonic voltages VUH2, VVH2 and VWH2 are set so as to reduce the twelfth-order electromagnetic force. More specifically, the second phase difference $\delta$ and the second amplitude V13 in the above equations (12) are adjusted so as to reduce the twelfth-order electromagnetic force. In addition, the waveforms of the U-phase, V-phase and W-phase second harmonic voltages VUH2, VVH2 and VWH2 have the same shape and are offset in phase from each other by ($2\pi/3$) in electrical angle $\theta e$.

In the present embodiment, the first harmonic voltages VUH1-VWH1 and the second harmonic voltages VUH2-VWH2 are stored in the memory of the harmonic voltage setting unit 30e as map data in association with the command angular speed $\omega tgt$ and the electrical angle $\theta e$. Each time the command angular speed $\omega tgt$ and the electrical angle $\theta e$ are inputted (e.g., in each control cycle of the control apparatus 30), the harmonic voltage setting unit 30e selects, from the map data, the first and second harmonic voltages VUH1-VWH1 and VUH2-VWH2 which are associated with (or corresponding to) the inputted command angular speed ωtgt and electrical angle θe. Then, the harmonic voltage setting unit 30e outputs the selected first harmonic voltages VUH1-VWH1 respectively to the first superimposing units 30fU-30fW and the selected second harmonic voltages VUH2-VWH2 respectively to the second superimposing units 30gU-30gW. Consequently, it is possible for the first and second superimposing units 30fU-30fW and 30gU-30gW to superimpose the first and second harmonic currents IUH1-IWH1 and IUH2-IWH2 on the respective fundamental currents IUB, IVB and IWB.

With the above configuration, when the actual angular speed ωm of rotation of the motor 10 approaches the resonance angular speed, the first and second harmonic voltages VUH1-VWH1 and VUH2-VWH2 are superimposed on the respective fundamental voltages VUB, VVB and VWB. Moreover, when the actual angular speed ωm of rotation of the motor 10 deviates from the resonance angular speed, the first and second harmonic voltages VUH1-VWH1 and VUH2-VWH2 superimposed on the respective fundamental voltages VUB, VVB and VWB decrease or become zero.

In practice, due to differences between individual motors 10 that are mass-produced, the magnetic flux characteristics of the permanent magnets 14a vary between individual motors 10. Therefore, for each individual motor 10, the first and second harmonic voltages VUH1-VWH1 and VUH2-VWH2 stored in the memory of the harmonic voltage setting unit 30e may deviate from the first and second harmonic voltages VUH1-VWH1 and VUH2-VWH2 suitable for reducing the tenth-order and twelfth-order electromagnetic forces. In this case, torque ripple of the motor 10 which does not contribute to the output torque of the motor 10 would be increased, thereby increasing magnetic noise of the motor 10.

In view of the above, in the present embodiment, the control apparatus 30 includes the correction value calculating unit 30i that performs a correction process for correcting the first and second harmonic voltages VUH1-VWH1 and VUH2-VWH2 stored in the memory of the harmonic voltage setting unit 30e. The correction process will be described hereinafter.

As shown in the following expression (13), the electromagnetic force F acting on the rotor 14 is proportional to magnetic flux φm produced by the permanent magnets 14a of the rotor 14 and electric current I flowing in the stator windings 12U-12W.

$$F \propto \phi_m \cdot I \quad (13)$$

When the rotor 14 rotates at a constant speed, the magnetic flux φm includes a sinusoidal magnetic flux $\phi_0$ which is a sinusoidal component and a magnetic flux distortion Δφ which is a distortion component from the sinusoidal magnetic flux $\phi_0$. Moreover, the electric current I includes a sinusoidal current $I_0$ which is a sinusoidal component and a current distortion ΔI which is a distortion component from the sinusoidal current $I_0$. Then, the above expression (13) can be transformed into the following expression (14):

$$F \propto (\phi_0 + \Delta\phi)(I_0 + \Delta I) = \phi_0 \cdot I_0 + (\Delta\phi \cdot I_0 + \phi_0 \cdot \Delta I) + \Delta\phi \cdot \Delta I \quad (14)$$
$$\cong \phi_0 \cdot I_0 + (\Delta\phi \cdot I_0 + \phi_0 \cdot \Delta I)$$

In the above expression (14), (Δφ×ΔI) is considerably smaller than the other terms and thus neglected. Moreover, on the right side of the above expression (14), the first term ($\phi_0 \times I_0$) represents the output torque of the motor 10 and the second term ($\Delta\phi \times I_0 + \phi_0 \times \Delta I$) represents the excitation force that causes magnetic noise. That is, magnetic noise can be reduced if the excitation force represented by ($\Delta\phi \times I_0 + \phi_0 \times \Delta I$) can be eliminated by supplying the first and second harmonic currents IUH1-IWH1 and IUH2-IWH2 to the stator windings 12U-12W.

However, due to differences between individual motors 10 that are mass-produced, the magnetic flux distortion Δφ varies between individual motors 10. Therefore, for each individual motor 10, the excitation force can be reduced by: (1) observing the magnetic flux distortion Δφ; (2) determining the current distortion ΔI which satisfies the following equation (15) with the observed magnetic flux distortion Δφ; and (3) supplying the determined current distortion ΔI as the harmonic currents to the stator windings 12U-12W.

$$\Delta\phi \cdot I_0 + \phi_0 \cdot \Delta I = 0 \quad (15)$$

Figure 5:
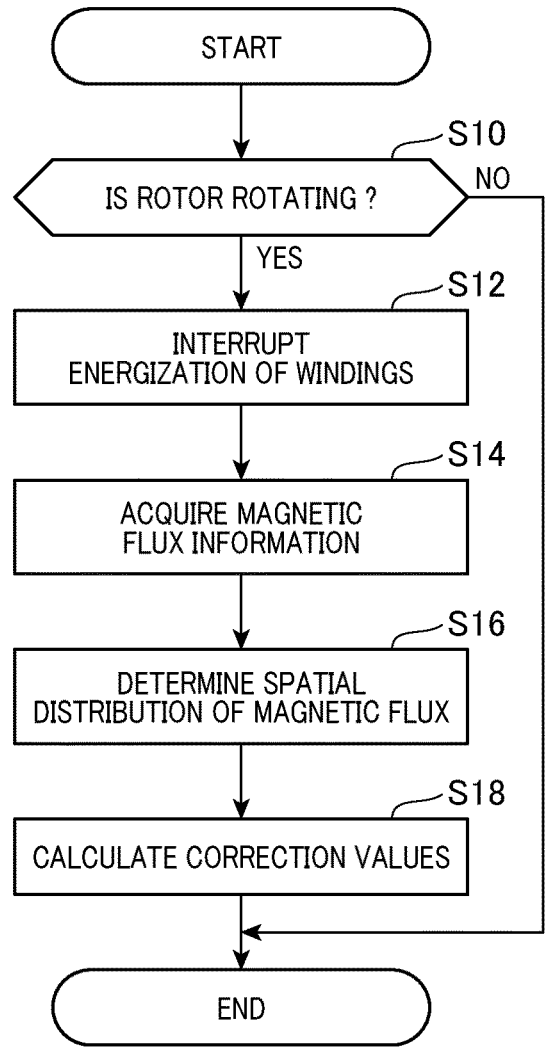
FIG. 5 is a flow chart illustrating a correction process for correcting harmonic voltages.

FIG. 5 shows the correction process of the correction value calculating unit 30i of the control apparatus 30. This process is performed during inspection of the control apparatus 30 at the factory before shipment or during starting of the motor 10.

First, at step S10, a determination is made as to whether the rotor 14 is rotating.

If the determination at step S10 produces a "NO" answer, the process directly goes to the end. In contrast, if the determination at step S10 produces a "YES" answer, the process proceeds to step S12.

At step S12, energization of the stator windings 12U-12W (i.e., supply of electric current to the stator windings 12U-12W) is temporarily interrupted.

Here, step S12 is executed for facilitating determination of the magnetic flux φm produced by the permanent magnets 14a of the rotor 14 and thereby avoiding increase of calculation processing. Specifically, when the stator windings 12U-12W are energized, the magnetic flux φe is produced by the electric current flowing in the stator windings 12U-12W. Thus, the magnetic flux detected by the Hall sensors 42a-42c includes both the magnetic flux φm produced by the permanent magnets 14a and the magnetic flux φe produced by the electric current flowing in the stator windings 12U-12W. Therefore, to correct the first and second harmonic voltages VUH1-VWH1 and VUH2-VWH2, it is necessary to subtract the magnetic flux φe produced by the electric current flowing in the stator windings 12U-12W from the magnetic flux detected by the Hall sensors 42a-42c. Consequently, calculation processing in the correction process is increased. In contrast, when the stator windings 12U-12W are not energized, the magnetic flux detected by the Hall sensors 42a-42c includes only the magnetic flux φm produced by the permanent magnets 14a. Therefore, it is unnecessary to perform a subtraction processing for determining the magnetic flux φm.

In addition, in the present embodiment, the correction value calculating unit 30i can also be regarded as an energization interrupting unit that executes step S12 to interrupt energization of the stator windings 12U-12W.

At step S14, the magnetic flux detected by the Hall sensors 42a-42c is acquired in association with the electrical angle θe.

In addition, by acquiring the magnetic flux φm produced by the permanent magnets 14a (i.e., the magnetic flux detected by the Hall sensors 42a-42c in the present embodiment) in association with the electrical angle θe, it is possible to suitably determine the magnetic flux characteristics of the permanent magnets 14a as a function whose independent variable is the electrical angle θe and dependent variable is the magnetic flux φm.

It should be noted that at least one of magnetic flux detection values of the Hall sensors 42a-42c may be acquired at step S14.

At step S16, the spatial distribution of the magnetic flux φm (or change of the magnetic flux φm with the electrical angle θe) is determined based on the magnetic flux acquired at step S14.

In addition, in the present embodiment, the correction value calculating unit 30i can also be regarded as a magnetic flux information acquiring unit that executes steps S14 and S16 to acquire magnetic flux information of the magnetic poles of the rotor 14 (i.e., information on the magnetic flux φm produced by the permanent magnets 14a).

At step S18, correction values of the first and second harmonic voltages VUH1-VWH1 and VUH2-VWH2 are calculated based on the spatial distribution of the magnetic flux φm determined at step S16.

Specifically, at step S18, the amplitudes and phase differences of the eleventh-order and thirteenth-order components of the magnetic flux φm are extracted based on the spatial distribution of the magnetic flux φm determined at step S16. Here, the phase differences of the eleventh-order and thirteenth-order components of the magnetic flux φm may be phase differences with respect to the fundamental voltages VUB-VWB expressed by the above equations (1) or phase differences with respect to a reference value of the electrical angle θe. Then, based on the extracted amplitude and phase difference of the eleventh-order component of the magnetic flux φm, both a first amplitude correction value for correcting the first amplitude V11 (i.e., the amplitude of the first harmonic voltages VUH1-VWH1) and a first phase correction value for correcting the first phase difference γ (i.e., the phase difference of the first harmonic voltages VUH1-VWH1) are calculated. More specifically, both the first amplitude correction value and the first phase correction value are calculated based on comparison between the extracted amplitude and phase difference of the eleventh-order component of the magnetic flux φm and a reference amplitude and a reference phase difference of the eleventh-order component of the magnetic flux φm which are stored in the memory in advance. Moreover, based on the extracted amplitude and phase difference of the thirteenth-order component of the magnetic flux φm, both a second amplitude correction value for correcting the second amplitude V13 (i.e., the amplitude of the second harmonic voltages VUH2-VWH2) and a second phase correction value for correcting the second phase difference δ (i.e., the phase difference of the second harmonic voltages VUH2-VWH2) are calculated. More specifically, both the second amplitude correction value and the second phase correction value are calculated based on comparison between the extracted amplitude and phase difference of the thirteenth-order component of the magnetic flux φm and a reference amplitude and a reference phase difference of the thirteenth-order component of the magnetic flux φm which are stored in the memory in advance. Thereafter, the first and second amplitudes V11 and V13 are corrected respectively using the calculated first and second amplitude correction values and the first and second phase differences γ and δ are corrected respectively using the calculated first and second phase correction values. For example, the first amplitude V11 may be corrected by multiplying the first amplitude V11 by the first amplitude correction value and the first phase difference γ may be corrected by multiplying the first phase difference γ by the first phase correction value.

After step S18, the temporarily-interrupted energization of the stator windings 12U-12W is resumed and then the correction process goes to the end.

In addition, the harmonic voltage setting unit 30e stores in the memory thereof the first and second harmonic voltages VUH1-VWH1 and VUH2-VWH2 whose amplitudes and phase differences are corrected by the above correction process.

According to the present embodiment, it is possible to achieve the following advantageous effects.

In the present embodiment, the first amplitude V11 and the first phase difference γ (i.e., the amplitude and phase difference of the first harmonic voltages VUH1-VWH1) are corrected based on the eleventh-order component of the magnetic flux φm produced by the permanent magnets 14a; the eleventh-order component varies at the variation angular speed of the first harmonic voltages VUH1-VWH1 (i.e., the variation angular speed of the first harmonic currents IUH1-IWH1). Moreover, the second amplitude V13 and the second phase difference δ (i.e., the amplitude and phase difference of the second harmonic voltages VUH2-VWH2) are corrected based on the thirteenth-order component of the magnetic flux φm; the thirteenth-order component varies at the variation angular speed of the second harmonic voltages VUH2-VWH2 (i.e., the variation angular speed of the second harmonic currents IUH2-IWH2).

With the above configuration, even when there are differences between individual motors 10, it is still possible to reduce, for each individual motor 10, variation in the radial electromagnetic force acting on the rotor 14.

In the present embodiment, the correction based on the eleventh-order component of the magnetic flux φm is made for the first amplitude V11 and the first phase difference γ which are stored in the memory in advance. Moreover, the correction based on the thirteenth-order component of the magnetic flux φm is made for the second amplitude V13 and the second phase difference δ which are stored in the memory in advance.

With the above configuration, it is unnecessary to generate from zero the first and second harmonic voltages VUH1-VWH1 and VUH2-VWH2 reflecting differences between individual motors 10. Consequently, it is possible to reduce the calculation load of the control apparatus 30 for setting the first and second harmonic voltages VUH1-VWH1 and VUH2-VWH2.

In the present embodiment, the magnetic flux components are extracted from the magnetic flux φm which are acquired (or determined) in association with the electrical angle θe. In addition, each of the extracted magnetic flux components varies at the variation angular speed of the electromagnetic force targeted for reduction.

With the above configuration, it is possible to suitably determine the actual distribution of the magnetic flux φm, thereby improving the accuracy of correction of the first and second harmonic voltages VUH1-VWH1 and VUH2-VWH2.

In the present embodiment, the magnetic flux information detected by the Hall sensors 42a-42c is used in the correction of the first and second harmonic voltages VUH1-VWH1 and VUH2-VWH2 as well as in the calculation of the electrical angle θe.

With the above configuration, it becomes possible to correct the first and second harmonic voltages VUH1-VWH1 and VUH2-VWH2 without employing a dedicated magnetic flux detection device in addition to the Hall sensors 42a-42c employed for the calculation of the electrical angle θe. Consequently, the parts count and thus the manufacturing cost of the motor control system can be reduced.

In the present embodiment, the magnetic flux φm produced by the permanent magnets 14a is acquired during a time period for which energization of the stator windings 12U-12W (i.e., supply of electric current to the stator windings 12U-12W) is interrupted.

With the above configuration, the magnetic flux φm produced by the permanent magnets 14a can be easily acquired without employing an external device provided outside the control apparatus 30. Moreover, since no additional calculation is needed for extracting the magnetic flux φm from the magnetic flux detected by the Hall sensors 42a-42c, it is possible to suppress increase in the calculation load of the control apparatus 30.

In the present embodiment, the correction process is performed during starting of the motor 10.

Consequently, it becomes possible to correct the first and second harmonic voltages VUH1-VWH1 and VUH2-VWH2 taking into account age deterioration of the motor 10. In addition, the correction process may be performed each time the motor 10 is started or when the motor 10 is started after a predetermined time from the last execution of the correction process.

Second Embodiment

This embodiment illustrates a control apparatus 30 which has a similar configuration to the control apparatus 30 according to the first embodiment. Accordingly, only the differences therebetween will be described hereinafter.

In the first embodiment, the control apparatus 30 includes the harmonic voltage setting unit 30e and the correction value calculating unit 30i (see FIG. 1). The harmonic voltage setting unit 30e includes the memory in which the first and second harmonic voltages VUH1-VWH1 and VUH2-VWH2 are stored in advance. The correction value calculating unit 30i performs the correction process (see FIG. 5) and thereby corrects the first and second harmonic voltages VUH1-VWH1 and VUH2-VWH2 stored in the memory of the harmonic voltage setting unit 30e.

Figure 6:
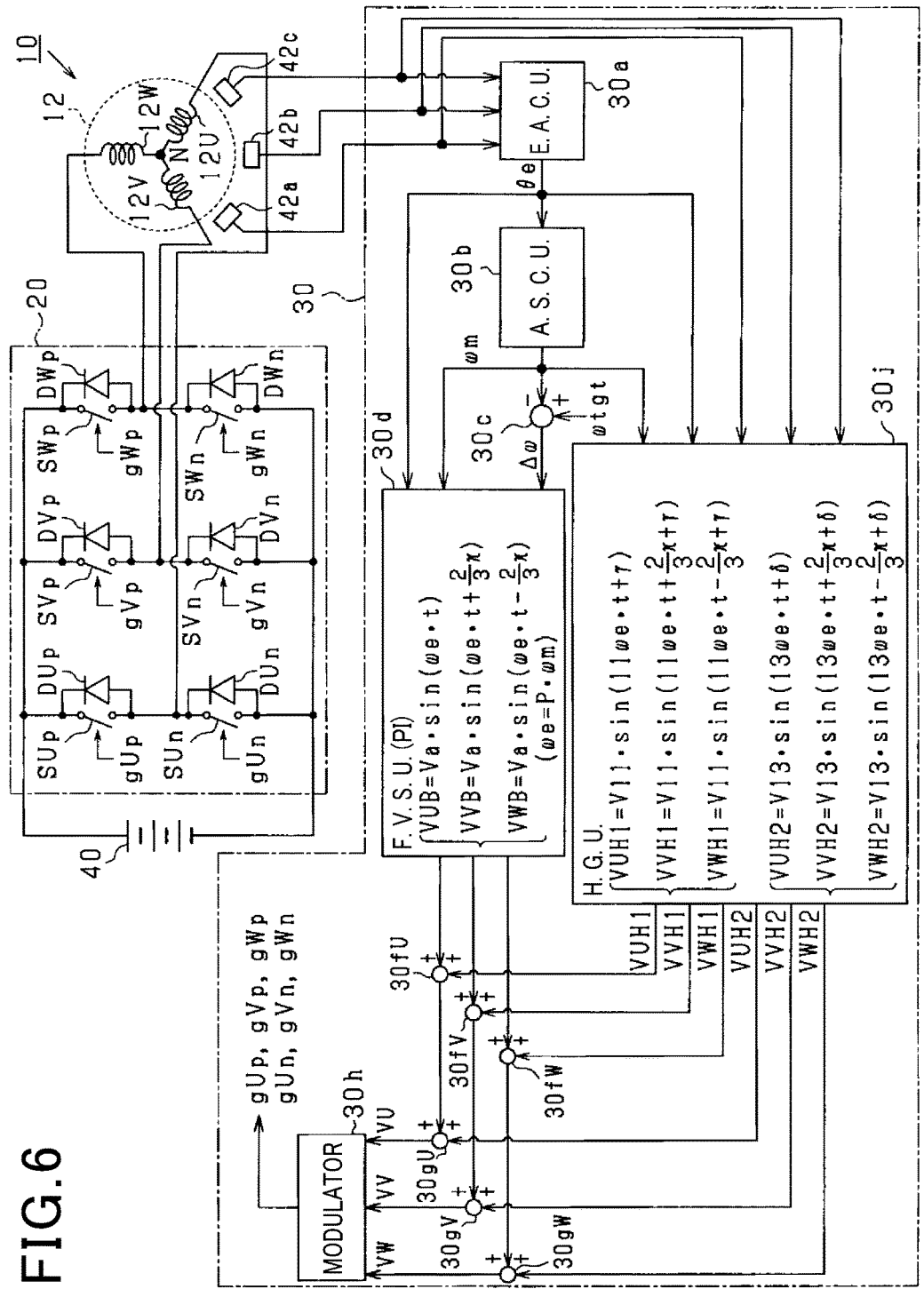
FIG. 6 is an overall configuration diagram of a motor control system according to a second embodiment.

In comparison, in the present embodiment, as shown in FIG. 6, the control apparatus 30 includes a harmonic generating unit (abbreviated to H. G U. in FIG. 6) 30j instead of the harmonic voltage setting unit 30e and the correction value calculating unit 30i described in the first embodiment.

The harmonic generating unit 30j generates, based on at least one of magnetic flux detection values of the Hall sensors 42a-42c, the first and second harmonic voltages VUH1-VWH1 and VUH2-VWH2.

Figure 7:
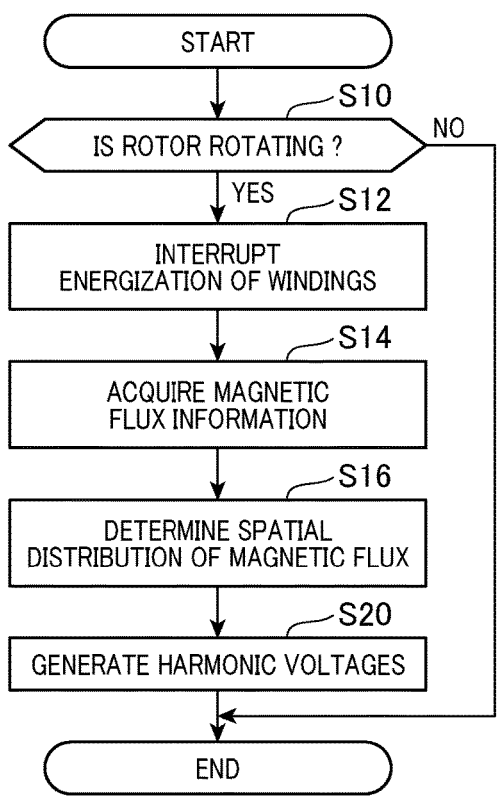
FIG. 7 is a flow chart illustrating a generation process for generating harmonic voltages.

FIG. 7 shows a generation process of the harmonic generating unit 30j for generating the first and second harmonic voltages VUH1-VWH1 and VUH2-VWH2. This process is performed during inspection of the control apparatus 30 at the factory before shipment, during starting of the motor 10 after shipment of the control apparatus 30, or during drive of the motor 10 after the motor 10 is started.

As shown in FIG. 7, the generation process includes steps S10, S12, S14, S16 and S20. Steps S10-S16 of the generation process are respectively identical to steps S10-S16 of the correction process described in the first embodiment (see FIG. 5). Therefore, for the sake of avoiding redundancy, a repeated description of steps S10-S16 is omitted hereinafter.

At step S20 of the generation process, the first and second harmonic voltages VUH1-VWH1 and VUH2-VWH2 are generated based on the spatial distribution of the magnetic flux φm determined at step S16.

Specifically, at step S20, the amplitudes and phase differences of the eleventh-order and thirteenth-order components of the magnetic flux φm are extracted based on the spatial distribution of the magnetic flux φm determined at step S16. Here, the phase differences of the eleventh-order and thirteenth-order components of the magnetic flux φm may be phase differences with respect to the fundamental voltages VUB-VWB expressed by the above equations (1) or phase differences with respect to a reference value of the electrical angle θe. Then, based on the extracted amplitudes and phase differences of the eleventh-order and thirteenth-order components of the magnetic flux φm, the first and second harmonic voltages VUH1-VWH1 and VUH2-VWH2 are generated.

Figure 8:
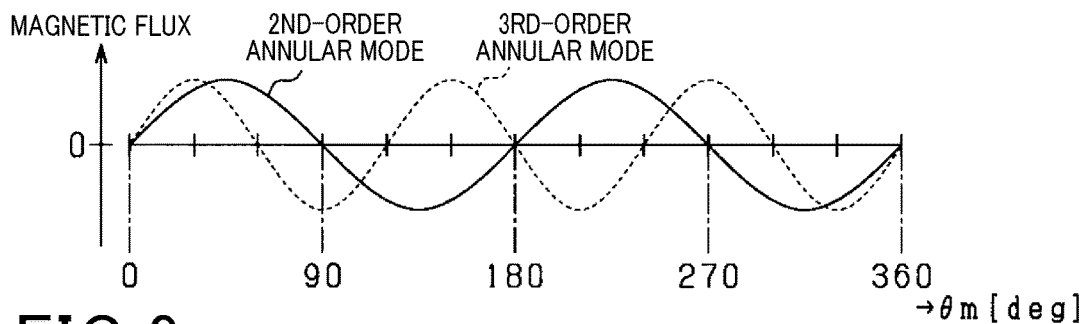
FIG. 8 is a schematic view illustrating the distribution of different magnetic fluxes in the motor.

More specifically, the amplitude and phases of the first harmonic currents IUH1-IWH1 are calculated based on the extracted amplitude and phase difference of the eleventh-order component of the magnetic flux φm and the amplitude and phases of the second harmonic currents IUH2-IWH2 are calculated based on the extracted amplitude and phase difference of the thirteenth-order component of the magnetic flux φm, so as to realize a spatial distribution of the magnetic flux φm with which it is possible to shift (or offset) the frequency of the current electromagnetic force from the resonance frequency of the current annular mode of the rotor 14. Here, the spatial distribution of the magnetic flux φm denotes the distribution of magnitude of the magnetic flux φm associated with the mechanical angle θm of the motor 10. In the present embodiment, magnetic noise increases when the frequency of the electromagnetic force is in the vicinity of the resonance frequency of the second-order annular mode of the rotor 14. Therefore, for shifting the frequency of the current electromagnetic force from the resonance frequency of the current annular mode (i.e., the second-order annular mode) of the rotor 14, the amplitude and phases of the first harmonic currents IUH1-IWH1 and the amplitude and phases of the second harmonic currents IUH2-IWH2 are calculated so as to alter the current spatial distribution of the magnetic flux which corresponds to the second-order annular mode into a spatial distribution of the magnetic flux which corresponds to the third-order annular mode, as shown in FIG. 8. It should be noted that for the sake of convenience, the amplitude of the magnetic flux corresponding to the second-order annular mode and the amplitude of the magnetic flux corresponding to the third-order annular mode are depicted to be equal in FIG. 8.

Moreover, the first amplitude V11 (i.e., the amplitude of the first harmonic voltages VUH1-VWH1) and the first phase difference γ (i.e., the phase difference of the first harmonic voltages VUH1-VWH1) are calculated based on the above-calculated amplitude and phases of the first harmonic currents IUH1-IWH1; the second amplitude V13 (i.e., the amplitude of the second harmonic voltages VUH2-VWH2) and the second phase difference δ (i.e., the phase difference of the second harmonic voltages VUH2-VWH2) are calculated based on the above-calculated amplitude and phases of the second harmonic currents IUH2-IWH2. Here, the transformation from the harmonic currents to the harmonic voltages can be made based on well-known voltage equations that associate the phase voltages applied to the motor 10 with the phase currents.

After the calculation of the first amplitude V11, the first phase difference γ, the second amplitude V13 and the second phase difference δ, the temporarily-interrupted energization of the stator windings 12U-12W is resumed. Then, the harmonic generating unit 30*j* generates and outputs the first and second harmonic voltages VUH1-VWH1 and VUH2-VWH2.

More specifically, the harmonic generating unit 30*j* calculates the electrical angular speed ωe on the basis of the angular speed ωm of rotation of the motor 10 calculated by the angular speed calculating unit 30*b*. Then, based on the above-calculated first amplitude V11 and first phase difference γ, the harmonic generating unit 30*j* outputs the first harmonic voltages VUH1-VWH1 in association with the calculated electrical angular speed ωe and the inputted electrical angle θe. Moreover, based on the above-calculated second amplitude V13 and second phase difference δ, the harmonic generating unit 30*j* outputs the second harmonic voltages VUH2-VWH2 in association with the calculated electrical angular speed ωe and the inputted electrical angle θe.

After step S20, the generation process goes to the end.

Figure 9:
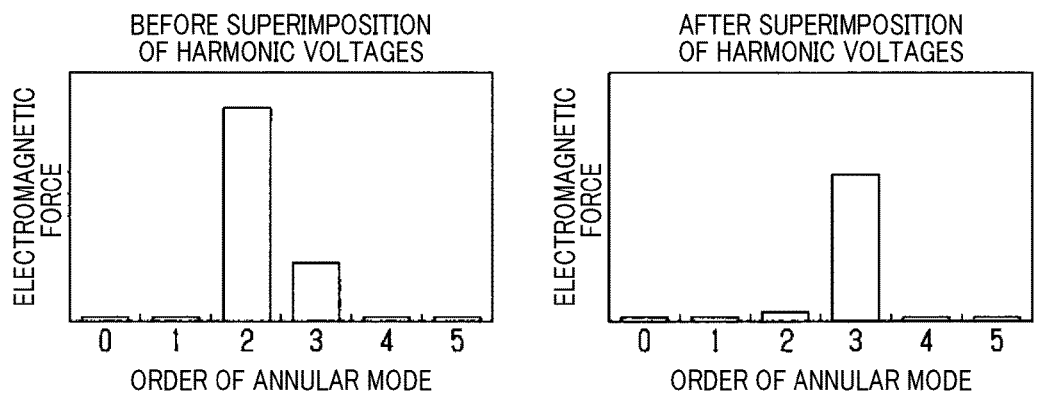
FIG. 9 is a schematic view illustrating the change in a radial electromagnetic force acting on the rotor before and after superimposing harmonic voltages.

FIG. 9 illustrates the alteration of the spatial distribution of the magnetic flux corresponding to the second-order annular mode into the spatial distribution of the magnetic flux corresponding to the third-order annular mode. The alternation is realized by superimposing the first and second harmonic voltages VUH1-VWH1 and VUH2-VWH2 on the respective fundamental voltages VUB, VVB and VWB.

As can be seen from FIG. 9, by the above alteration, the frequency of the electromagnetic force is shifted from a frequency corresponding to the second-order annular mode to a frequency corresponding to the third-order annular mode. Consequently, even when there are differences between individual motors 10, it is still possible to reduce, for each individual motor 10, variation in the radial electromagnetic force acting on the rotor 14.

In addition, according to the present embodiment, it is possible to eliminate the task of adapting the harmonic voltages to be stored in a memory as in the first embodiment. Consequently, it is possible to reduce the manpower required for design of the control apparatus 30.

Third Embodiment

This embodiment illustrates a control apparatus 30 which has a similar configuration to the control apparatus 30 according to the first embodiment. Accordingly, only the differences therebetween will be described hereinafter.

In the first embodiment, the harmonic voltages VUH1-VWH1 and VUH2-VWH2 are set in the three-phase fixed coordinate system.

In comparison, in the present embodiment, the harmonic voltages VUH1-VWH1 and VUH2-VWH2 are set in a d-q coordinate system which is a two-phase rotating coordinate system of the motor 10.

Figure 10:
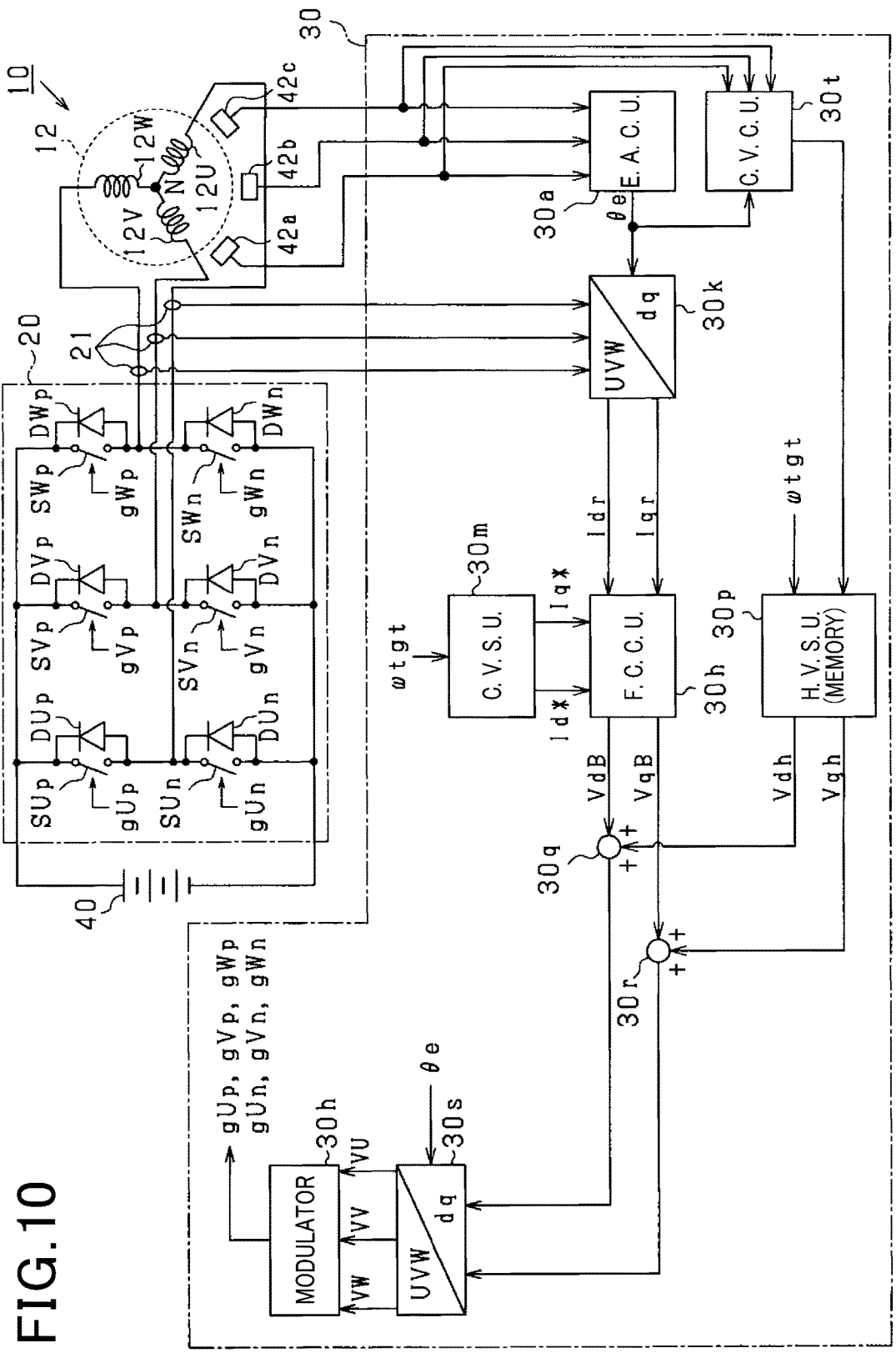
FIG. 10 is an overall configuration diagram of a motor control system according to a third embodiment.

FIG. 10 shows the overall configuration of an in-vehicle motor control system to which the control apparatus 30 according to the present embodiment is applied.

As shown in FIG. 10, in the present embodiment, the motor control system includes a current detecting unit 21 that detects at least two phase currents supplied to the motor 10. More particularly, in the present embodiment, the current detecting unit 21 detects U-phase, V-phase and W-phase currents supplied respectively to the U-phase, V-phase and W-phase stator windings 12U, 12V and 12W of the motor 10. The detection values of the current detecting unit 21 are inputted to the control apparatus 30.

Next, a drive control of the motor 10 by the control apparatus 30 according to the present embodiment will be described.

As shown in FIG. 10, in the present embodiment, the control apparatus 30 includes a two-phase transforming unit 30*k*, a command value setting unit (abbreviated to C. V. S. U. in FIG. 10) 30*m*, a fundamental current control unit (abbreviated to F. C. C. U. in FIG. 10) 30*n*, a harmonic voltage setting unit (abbreviated to H. V. S. U. in FIG. 10) 30*p*, a d-axis superimposing unit 30*q* and a q-axis superimposing unit 30*r*, a three-phase transforming unit 30*s* and a correction value calculating unit (abbreviated to C. V. C. U. in FIG. 10) 30*t*, instead of the angular speed calculating unit 30*b*, the fundamental voltage setting unit 30*d*, the harmonic voltage setting unit 30*e*, the first superimposing units 30*f*U-30*f*W, the second superimposing units 30*g*U-30*g*W and the correction value calculating unit 30*i* in the first embodiment (see FIG. 1).

The two-phase transforming unit 30*k* transforms, based on the phase currents detected by the current detecting unit 21 and the electrical angle θe calculated by the electrical angle calculating unit 30*a*, the U-phase, V-phase and W-phase currents in the three-phase fixed coordinate system into d-axis current Idr and q-axis current Iqr in the d-q coordinate system.

The command value setting unit 30*m* sets, based on the command angular speed ωtgt, a d-axis command current Id* and a q-axis command current Iq* which are current command values in the two-phase rotating coordinate system. In addition, the d-axis command current Id* and the q-axis command current Iq* may be set using map information that associates the command angular speed ωtgt with the d-axis command current Id* and the q-axis command current Iq*.

The fundamental current control unit 30*n* calculates a d-axis fundamental voltage VdB as a manipulated variable for feedback-controlling the d-axis current Idr to the d-axis command current Id*. The d-axis fundamental voltage VdB is a d-axis voltage component of the motor 10. Moreover, the fundamental current control unit 30*n* also calculates a q-axis fundamental voltage VqB as a manipulated variable for feedback-controlling the q-axis current Iqr to the q-axis command current Iq*. The q-axis fundamental voltage VqB is a q-axis voltage component of the motor 10. It should be noted that in the present embodiment, the d-axis and q-axis fundamental voltages VdB and VqB are DC components in the d-q coordinate system.

In addition, in the present embodiment, the fundamental current control unit 30*n* can also be regarded as a fundamental setting unit that sets the d-axis and q-axis fundamental voltages VdB and VqB.

The harmonic voltage setting unit 30*p* sets, based on the command angular speed ωtgt, both a d-axis harmonic voltage Vdh and a q-axis harmonic voltage Vqh. The d-axis harmonic voltage Vdh is a d-axis voltage component, while the q-axis harmonic voltage Vqh is a q-axis voltage component. In the present embodiment, the harmonic voltage setting unit 30*p* includes a memory which is a data storage unit. The d-axis and q-axis harmonic voltages Vdh and Vqh are stored in the memory in association with the command angular speed ωtgt.

In the present embodiment, the tenth-order electromagnetic force is shifted to (or converted into) the fourteenth-order electromagnetic force. Therefore, the harmonic voltages to be superimposed on the fundamental voltages are the eleventh-order and thirteenth-order harmonic voltages in the fixed coordinate system. Moreover, the eleventh-order and thirteenth-order harmonic voltages in the fixed coordinate system are transformed into the twelfth-order harmonic voltages in the d-q coordinate system. Therefore, the d-axis and q-axis harmonic voltages Vdh and Vqh are the twelfth-order harmonic voltages.

The d-axis superimposing unit 30q superimposes (or adds) the d-axis harmonic voltage Vdh on (or to) the d-axis fundamental voltage VdB and outputs the resultant voltage (VdB+Vdh). The q-axis superimposing unit 30r superimposes (or adds) the q-axis harmonic voltage Vqh on (or to) the q-axis fundamental voltage VqB and outputs the resultant voltage (VqB+Vqh).

The three-phase transforming unit 30s calculates, based on the output voltage (VdB+Vdh) of the d-axis superimposing unit 30q, the output voltage (VqB+Vqh) of the q-axis superimposing unit 30r and the electrical angle θe, U-phase, V-phase and W-phase command voltages VU, VV and VW. Then, the calculated command voltages VU, VV and VW are inputted to the modulator 30h.

In the present embodiment, the correction value calculating unit 30t performs the following process after executing steps S10-S16 shown in FIG. 5.

First, the correction value calculating unit 30t extracts, based on the spatial distribution of the magnetic flux determined at step S16, the amplitudes and phase differences of the eleventh-order and thirteenth-order magnetic flux components targeted for reduction. Then, based on the extracted amplitudes and phase differences of the eleventh-order and thirteenth-order magnetic flux components, the correction value calculating unit 30t either calculates a correction value for correcting only the d-axis harmonic voltage Vdh or calculates correction values for respectively correcting both the d-axis harmonic voltage Vdh and the q-axis harmonic voltage Vqh. Thereafter, the correction value calculating unit 30t either corrects only the d-axis harmonic voltage Vdh using the calculated correction value or corrects both the d-axis harmonic voltage Vdh and the q-axis harmonic voltage Vqh using the respective correction values.

According to the present embodiment, it is possible to achieve the same advantageous effects as achievable according to the first embodiment.

Fourth Embodiment

This embodiment illustrates a control apparatus 30 which has a similar configuration to the control apparatus 30 according to the third embodiment. Accordingly, only the differences therebetween will be described hereinafter.

In the third embodiment, the control apparatus 30 includes the harmonic voltage setting unit 30p and the correction value calculating unit 30t (see FIG. 10). The harmonic voltage setting unit 30p includes the memory in which the d-axis and q-axis harmonic voltages Vdh and Vqh are stored in advance. The correction value calculating unit 30t corrects only the d-axis harmonic voltage Vdh or both the d-axis harmonic voltage Vdh and the q-axis harmonic voltage Vqh.

Figure 11:
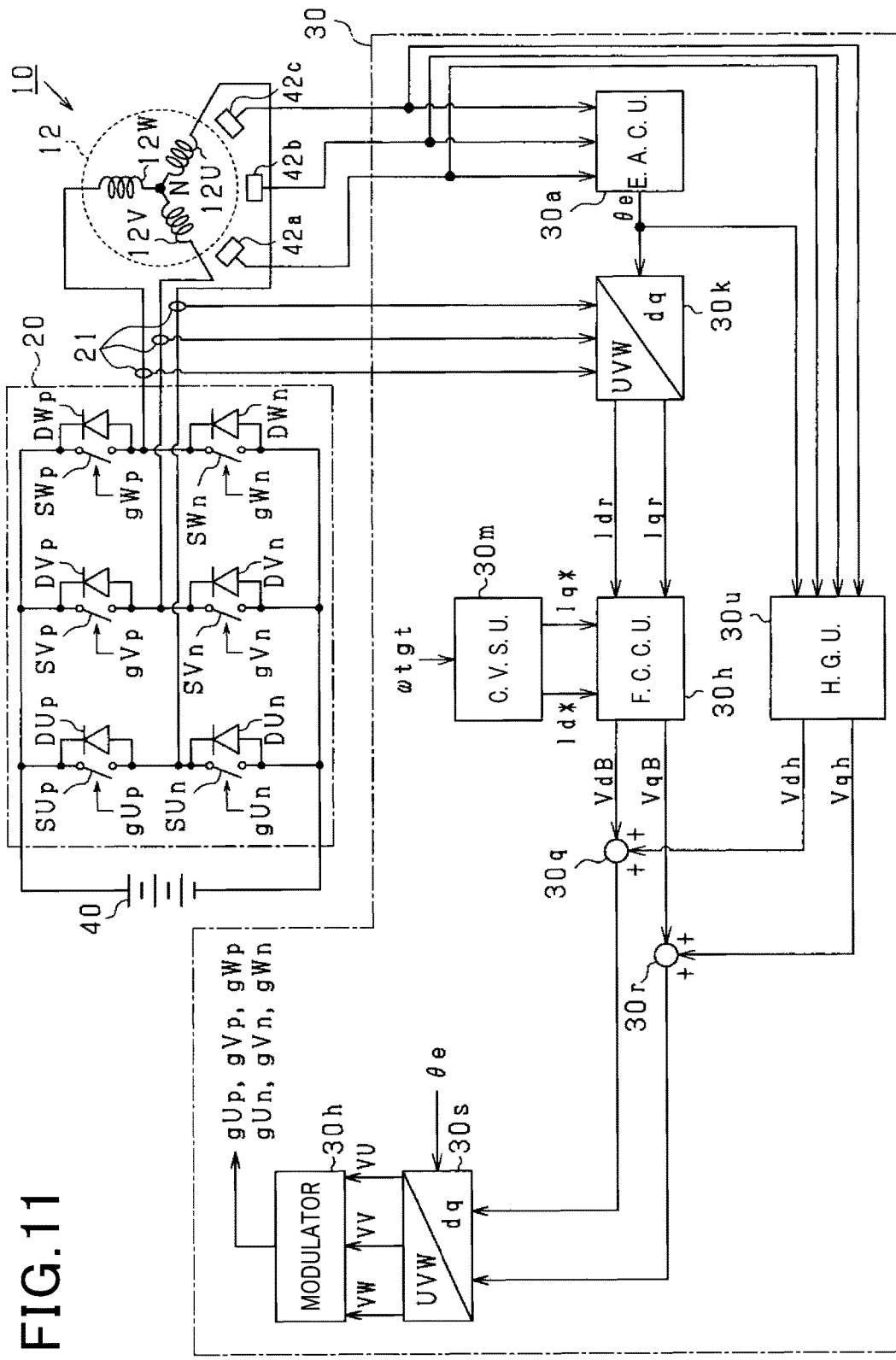
FIG. 11 is an overall configuration diagram of a motor control system according to a fourth embodiment.

In comparison, in the present embodiment, as shown in FIG. 11, the control apparatus 30 includes a harmonic generating unit (abbreviated to H. G. U. in FIG. 11) 30u instead of the harmonic voltage setting unit 30p and the correction value calculating unit 30t described in the first embodiment.

The harmonic generating unit 30u generates, based on at least one of magnetic flux detection values of the Hall sensors 42a-42c, the d-axis and q-axis harmonic voltages Vdh and Vqh.

Specifically, the harmonic generating unit 30u performs the following process after executing steps S10-S16 shown in FIG. 7.

First, the harmonic generating unit 30u extracts, based on the spatial distribution of the magnetic flux determined at step S16, the amplitudes and phase differences of the eleventh-order and thirteenth-order magnetic flux components targeted for reduction. Then, based on the extracted amplitudes and phase differences of the eleventh-order and thirteenth-order magnetic flux components, the harmonic generating unit 30u generates the d-axis and q-axis harmonic voltages Vdh and Vqh.

More specifically, the harmonic generating unit 30u calculates the amplitude and phases of the first harmonic currents IUH1-IWH1 based on the extracted amplitude and phase difference of the eleventh-order magnetic flux component and the amplitude and phases of the second harmonic currents IUH2-IWH2 based on the extracted amplitude and phase difference of the thirteenth-order magnetic flux component, so as to realize a spatial magnetic flux distribution with which it is possible to shift (or offset) the frequency of the current electromagnetic force from the resonance frequency of the current annular mode of the rotor 14. Further, based on the calculated amplitudes and phases of the first and second harmonic currents IUH1-IWH1 and IUH2-IWH2, the harmonic generating unit 30u calculates the d-axis and q-axis harmonic voltages Vdh and Vqh. Then, the temporarily-interrupted energization of the stator windings 12U-12W is resumed. Thereafter, the harmonic generating unit 30u generates and outputs the d-axis and q-axis harmonic voltages Vdh and Vqh.

According to the present embodiment, it is possible to eliminate the task of adapting the harmonic voltages to be stored in a memory as in the third embodiment. Consequently, it is possible to reduce the manpower required for design of the control apparatus 30.

Other Embodiments

While the above particular embodiments have been shown and described, it will be understood by those skilled in the art that the present invention can also be embodied in various other modes without departing from the spirit of the present invention.

(1) In the above embodiments, the magnetic flux φm produced by the permanent magnets 14a is acquired during a time period for which energization of the stator windings 12U-12W is interrupted.

However, the magnetic flux φm produced by the permanent magnets 14a may also be acquired during a time period for which the motor 10 is driven with energization of the stator windings 12U-12W. More specifically, in this case, the magnetic flux φm may be acquired by subtracting the magnetic flux φe produced by the electric current flowing in the stator windings 12U-12W from the magnetic flux detected by the Hall sensors 42a-42c. In addition, in this case, the motor control system may further include, in addition to the magnetic flux detecting unit constituted of the Hall sensors 42-42c, another magnetic flux detecting unit that detects magnetic flux through the stator windings 12U-12W.

Alternatively, the magnetic flux φm may be acquired during a time period for which the motor 10 is driven with energization of the stator windings 12U-12W, without employing any additional magnetic flux detecting unit. More specifically, depending on arrangement of the magnetic flux detecting unit constituted of the Hall sensors 42-42c, the influence of the magnetic flux φe, which is produced by the electric current flowing in the stator windings 12U-12W, on the detection results of the magnetic flux detecting unit is so small as to be negligible. In this case, for example, the correction value calculating unit 30i in the first embodiment may be modified to perform a correction process as shown in FIG. 12 instead of the correction process shown in FIG. 5.

In the correction process shown in FIG. 12, if the determination at step S10 produces a "YES" answer, the process proceeds to step S22.

At step S22, a determination is made as to whether the first and second harmonic voltages VUH1-VWH1 and VUH2-VWH2 outputted from the harmonic voltage setting unit 30e are being superimposed on the respective fundamental voltages VUB, VVB and VWB.

If the determination at step S22 produces a "NO" answer, the process jumps to step S14 without executing step S24. In contrast, if the determination at step S22 produces a "YES" answer, the process proceeds to step S24. At step S24, the correction value calculating unit 30i commands the harmonic voltage setting unit 30e to stop generating and outputting the first and second harmonic voltages VUH1-VWH1 and VUH2-VWH2. Consequently, the superimposition of the first and second harmonic voltages VUH1-VWH1 and VUH2-VWH2 on the respective fundamental voltages VUB, VVB and VWB is interrupted. Then, the process proceeds to step S14.

In addition, at step S24, the outputting of the fundamental voltages VUB, VVB and VWB from the fundamental voltage setting unit 30d may be continued.

(2) In the second embodiment, the harmonic generating unit 30j may be modified to calculate the magnetic flux distortion Δφ based on the detected magnetic flux φm and then calculate the first and second harmonic currents IUH1-IWH1 and IUH2-IWH2 based on the above equation (15) with the calculated magnetic flux distortion Δφ. Consequently, it would be possible to reduce the manpower required for adaption of the first and second harmonic voltages VUH1-VWH1 and VUH2-VWH2. In addition, the calculated first and second harmonic currents IUH1-IWH1 and IUH2-IWH2 may be transformed into the first and second harmonic voltages VUH1-VWH1 and VUH2-VWH2 based on voltage equations of the motor 10.

(3) In the first embodiment, instead of the first and second harmonic voltages VUH1-VWH1 and VUH2-VWH2, the first and second harmonic currents IUH1-IWH1 and IUH2-IWH2 may be stored in the memory as harmonic command values. In this case, it is possible to first transform the stored first and second harmonic currents IUH1-IWH1 and IUH2-IWH2 into the first and second harmonic voltages VUH1-VWH1 and VUH2-VWH2 based on voltage equations of the motor 10 and then output the resultant first and second harmonic voltages VUH1-VWH1 and VUH2-VWH2 respectively to the first and second superimposing units 30fU-30fW and 30gU-30gW.

In addition, the above modification may be similarly made to the third embodiment.

(4) The application of the present invention is not limited to motor control systems which include a rotation angle detecting unit for detecting rotation angle of the rotor 14. Instead, the present invention may also be applied to motor control systems which include no rotation angle detecting unit and perform a position sensor-less control.

(5) In the above embodiments, the magnetic sensors are implemented by the Hall sensors 42a-42c. However, the magnetic sensors may alternatively be implemented by a linear Hall IC or a search coil.

Moreover, in the above embodiments, the magnetic sensors (i.e., the Hall sensors 42a-42c) are arranged at positions where it is possible to detect, of the main magnetic flux and leakage magnetic flux, the leakage magnetic flux. However, the magnetic sensors may alternatively be arranged, in the case receiving the motor 10, at positions where it is possible to detect the main magnetic flux between the permanent magnets 14a of the rotor 14 and the teeth 12a of the stator 12.

(6) In the above embodiments, the eleventh-order and thirteenth-order harmonic currents are superimposed on the fundamental currents so as to convert the tenth-order electromagnetic force into the fourteenth-order electromagnetic force.

However, other odd-number-order harmonic currents may also be superimposed on the fundamental currents. For example, when the variation angular speed of the fourth-order electromagnetic force is in the vicinity of the resonance angular speed, it is possible to superimpose the fifth-order, seventh-order, ninth-order and eleventh-order harmonic currents on the fundamental currents so as to convert the fourth-order electromagnetic force into the twelfth-order electromagnetic force whose variation angular speed is considerably away from the resonance angular speed.

(7) In the second embodiment, the harmonic generating unit 30j may modify the harmonic voltages while superimposing the harmonic voltages on the fundamental voltages.

More specifically, the harmonic generating unit 30j may first generate initial first harmonic voltages VUha, VVha and VWha based on the first amplitude V11 and first phase difference γ calculated at step S20 of FIG. 7 and initial second harmonic voltages VUhb, VVhb and VWhb based on the second amplitude V13 and second phase difference δ calculated at step S20. Then, while superimposing the initial first and second harmonic voltages VUha-VWha and VUhb-VWhb on the respective fundamental voltages VUB-VWB, the harmonic generating unit 30j may vary the amplitudes and phases of the initial first and second harmonic voltages VUha-VWha and VUhb-VWhb, thereby determining the optimal amplitudes and phases thereof for minimizing the variation in the radial electromagnetic force acting on the rotor 14.

(8) In the above embodiments, the rotation angle of the motor 10 is determined based on the detection signals of the Hall sensors 42a-42c. However, the rotation angle of the motor 10 may alternatively be determined by means of other devices, such as an encoder or a resolver.

(9) In the above embodiments, the motor control system may be modified to perform a position sensor-less control without detecting the rotation angle of the motor 10.

(11) In the above embodiments, the controlled variable of the motor 10 is the angular speed ωm of rotation of the motor 10.

However, the controlled variable of the motor 10 may alternatively be torque of the motor 10. In this case, instead of the command angular speed ωtgt, a command torque may be inputted to, for example, the command value setting unit 30m shown in FIG. 10.

In addition, the controlled variable of the motor 10 may also be the angular position of the motor 10.

(12) In the above embodiments, the motor 10 is a concentrated winding motor. However, the motor 10 may alternatively be a distributed winding motor.

In the above embodiments, the motor 10 is configured as an outer rotor motor. However, the motor 10 may alternatively be configured as an inner rotor motor.

In the above embodiments, the motor 10 is a three-phase motor. However, the number of phases of the motor 10 may alternatively be four or more.

In the above embodiments, the motor 10 is configured as a permanent magnet motor. However, the motor 10 may alternatively be configured as a field winding motor.

In the above embodiments, the motor 10 is a blower motor used in an in-vehicle air conditioner. However, the motor 10 may alternatively be used for other purposes.

What is claimed is:

1. A control apparatus for a rotating electric machine, the control apparatus being applied to a system which includes the rotating electric machine and an electric power converter, the rotating electric machine including a stator having a winding wound therein and a rotor having a plurality of magnetic poles formed therein, the electric power converter being electrically connected with the rotating electric machine to supply a drive current to the winding and thereby drive the rotating electric machine, the control apparatus comprising:
   a magnetic flux information acquiring unit that acquires magnetic flux information of the magnetic poles;
   a fundamental setting unit that sets a fundamental command value for supplying a fundamental current to the winding;
   a harmonic setting unit that sets, based on the magnetic flux information acquired by the magnetic flux information acquiring unit, a harmonic command value for supplying a reduction current to the winding, the reduction current being a harmonic current for reducing variation in a radial electromagnetic force acting on the rotor; and
   an operating unit that operates, based on the fundamental command value set by the fundamental setting unit and the harmonic command value set by the harmonic setting unit, the electric power converter to supply the winding with the drive current that is obtained by superimposing the reduction current on the fundamental current.

2. The control apparatus as set forth in claim 1, further comprising:
   a rotation angle calculating unit that calculates rotation angle of the rotating electric machine; and
   an extracting unit that extracts, based on the rotation angle calculated by the rotation angle calculating unit and the magnetic flux information acquired by the magnetic flux information acquiring unit, a magnetic flux component of the magnetic poles, the magnetic flux component varying at a variation angular speed of the reduction current,
   wherein
   the harmonic setting unit includes a harmonic generating unit that generates the harmonic command value based on the magnetic flux component extracted by the extracting unit, and
   the operating unit operates, based on the fundamental command value and the harmonic command value generated by the harmonic generating unit, the electric power converter to supply the drive current to the winding.

3. The control apparatus as set forth in claim 1, further comprising:
   a storage unit that stores the harmonic command value therein; and
   a correcting unit that corrects, based on the magnetic flux information acquired by the magnetic flux information acquiring unit, the harmonic command value stored in the storage unit,
   wherein
   the operating unit operates, based on the fundamental command value and the harmonic command value corrected by the correcting unit, the electric power converter to supply the drive current to the winding.

4. The control apparatus as set forth in claim 3, further comprising:
   a rotation angle calculating unit that calculates rotation angle of the rotating electric machine; and
   an extracting unit that extracts, based on the rotation angle calculated by the rotation angle calculating unit and the magnetic flux information acquired by the magnetic flux information acquiring unit, a magnetic flux component of the magnetic poles, the magnetic flux component varying at a variation angular speed of the reduction current,
   wherein
   the correcting unit corrects, based on the magnetic flux component extracted by the extracting unit, the harmonic command value stored in the storage unit.

5. The control apparatus as set forth in claim 1, further comprising a rotation angle calculating unit that calculates, based on the magnetic flux information acquired by the magnetic flux information acquiring unit, rotation angle of the rotating electric machine,
   wherein
   the fundamental setting unit sets, based on the rotation angle calculated by the rotation angle calculating unit, the fundamental command value for controlling a controlled variable of the rotating electric machine to a command value of the controlled variable.

6. The control apparatus as set forth in claim 1, further comprising an energization interrupting unit that temporarily interrupts energization of the winding during rotation of the rotor,
   wherein
   the magnetic flux information acquiring unit acquires the magnetic flux information of the magnetic poles during a time period for which energization of the winding is interrupted by the energization interrupting unit.

7. The control apparatus as set forth in claim 1, wherein in the system, there is provided a magnetic flux detecting unit that detects magnetic flux of the magnetic poles, and
   the magnetic flux information acquiring unit acquires the magnetic flux detected by the magnetic flux detecting unit as the magnetic flux information of the magnetic poles.

8. The control apparatus as set forth in claim 7, wherein in the system, the magnetic flux detecting unit is arranged at a position where it is possible for the magnetic flux detecting unit to detect leakage magnetic flux of the magnetic poles.

9. The control apparatus as set forth in claim 7, wherein the magnetic flux detecting unit includes one of a Hall sensor, a linear Hall IC and a search coil.

10. The control apparatus as set forth in claim 1, wherein the rotating electric machine is a permanent magnet synchronous machine which includes a plurality of permanent magnets that form the magnetic poles.

11. The control apparatus as set forth in claim 1, wherein the rotating electric machine is of an outer rotor type such that the rotor is disposed radially outside the stator.

* * * * *